United States Patent [19]
Boyovich et al.

[11] Patent Number: 6,118,083
[45] Date of Patent: Sep. 12, 2000

[54] WEIGHT MEASUREMENT APPARATUS FOR VEHICLES

[75] Inventors: Richard A. Boyovich, Kent; Larry D. Santi, Renton, both of Wash.

[73] Assignee: Creative Microsystems, Renton, Wash.

[21] Appl. No.: 09/148,605

[22] Filed: Sep. 4, 1998

Related U.S. Application Data

[63] Continuation-in-part of application No. 08/948,406, Oct. 10, 1997, abandoned, and a continuation-in-part of application No. 08/948,099, Oct. 9, 1997, abandoned, and a continuation-in-part of application No. 08/948,304, Oct. 9, 1997, abandoned, and a continuation-in-part of application No. 08/758,283, Nov. 8, 1996, Pat. No. 5,811,738.

[51] Int. Cl.[7] .............................. G01G 19/08; G01L 1/04
[52] U.S. Cl. .................... 177/136; 177/211; 73/862.631; 73/862.627
[58] Field of Search ..................................... 177/136, 137, 177/138, 139, 211, 229; 73/862.631, 862.627, 862.634, 862.636, 862.637, 862.638

[56] References Cited

U.S. PATENT DOCUMENTS

| | | | |
|---|---|---|---|
| Re. 35,301 | 7/1996 | Reichow | 177/136 |
| 3,565,196 | 2/1971 | Laimins et al. | 177/211 |
| 3,602,866 | 8/1971 | Saxl | 338/5 |
| 3,603,418 | 9/1971 | Schmidt et al. | 177/136 |
| 3,650,340 | 3/1972 | Bradley | 177/136 |
| 3,661,220 | 5/1972 | Harris | 177/136 |
| 3,734,216 | 5/1973 | Nordstrom et al. | 177/136 |
| 3,854,540 | 12/1974 | Holmstrom, Jr. | 177/136 |
| 3,857,452 | 12/1974 | Hartman | 177/136 |
| 3,878,908 | 4/1975 | Anderson et al. | 177/136 |
| 3,889,767 | 6/1975 | Scott et al. | 177/136 |
| 3,935,915 | 2/1976 | Seilly et al. | 177/136 |
| 3,990,032 | 11/1976 | Fish et al. | 338/5 |
| 4,042,049 | 8/1977 | Reichow et al. | 177/137 |
| 4,249,623 | 2/1981 | McCauley | 177/136 |
| 4,287,958 | 9/1981 | Schmidt | 177/136 |
| 4,364,279 | 12/1982 | Stern et al. | 73/862.66 |
| 4,420,985 | 12/1983 | Raskin | 73/862.66 |
| 4,558,756 | 12/1985 | Seed | 177/211 |
| 4,581,948 | 4/1986 | Reichow | 73/862.65 |
| 4,666,003 | 5/1987 | Reichow | 177/136 |
| 4,673,047 | 6/1987 | Harbour | 177/136 |
| 4,699,399 | 10/1987 | Jable et al. | 280/680 |
| 4,775,018 | 10/1988 | Kroll et al. | 177/211 |
| 4,884,664 | 12/1989 | Reichow | 177/137 |
| 4,969,529 | 11/1990 | Reichow | 177/137 |
| 5,007,042 | 4/1991 | Santi | 370/9 |
| 5,600,104 | 2/1997 | McCauley et al. | 177/136 |
| 5,710,716 | 1/1998 | Hurst et al. | 364/508 |
| 5,811,738 | 9/1998 | Boyovich et al. | 177/136 |
| 5,880,409 | 3/1999 | Hartman | 177/137 |

OTHER PUBLICATIONS

Advertisement of Structural Instrumentation, Inc., Seattle, Washington, for Load Cells, *Log Trucker*, Oct. 1996.

H–900 Single Point Suspension Series Configurations & Parts Identification catalog, Hutchens Industries, Springfield, Missouri, Apr. 1996 (17 pages).

(List continued on next page.)

*Primary Examiner*—Randy W. Gibson
*Attorney, Agent, or Firm*—Kevin S. Costanza; Seed IP Law Group PLLC

[57] ABSTRACT

A weight measurement apparatus of the type for determining the weight of a load placed on a wheeled vehicle. The apparatus includes an elongated load bearing member coupled between the load and the wheels. The load bearing member has two apertures that extend completely through the load bearing member, and load sensors attached to the walls of the apertures for calculating the stress in the apparatus created by the load. The apparatus can further include a decoder for converting the stress measurement to a weight value and an onboard display device for displaying the weight of the load to the vehicle operator. The apparatus may be sized and shaped to retrofit existing structural components of a truck, thereby adding a weight measurement capability to the vehicle.

63 Claims, 18 Drawing Sheets

OTHER PUBLICATIONS 21 photographs of prior art devices, dated on or about Aug. 15, 1995.

Drawing indicating truck types on which a weight measurement device may be installed, Moro Motors, Inc., Warren, Arkansas, Jun. 9, 1995 (best copy available).

Product brochure of Structural Instrumentation, Inc., Seattle, Washington, for Payload Management Systems, Jun. 1995.

Metrox Products, Load Pins—The Easy, Accurate Way to Measure Load, Force, and Tension for Any Application (Handbook & Product Catalog), M/D TOTCO Instrumentation, Cedar Park, Texas, 1994.

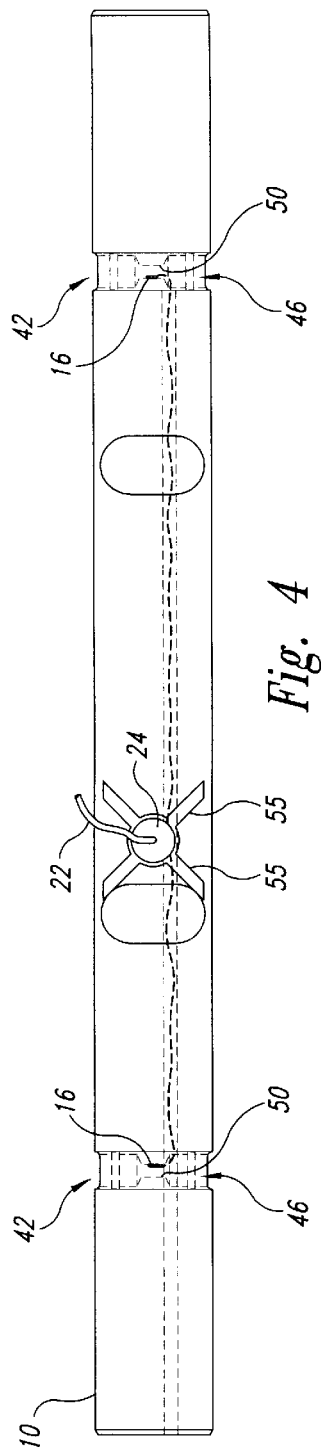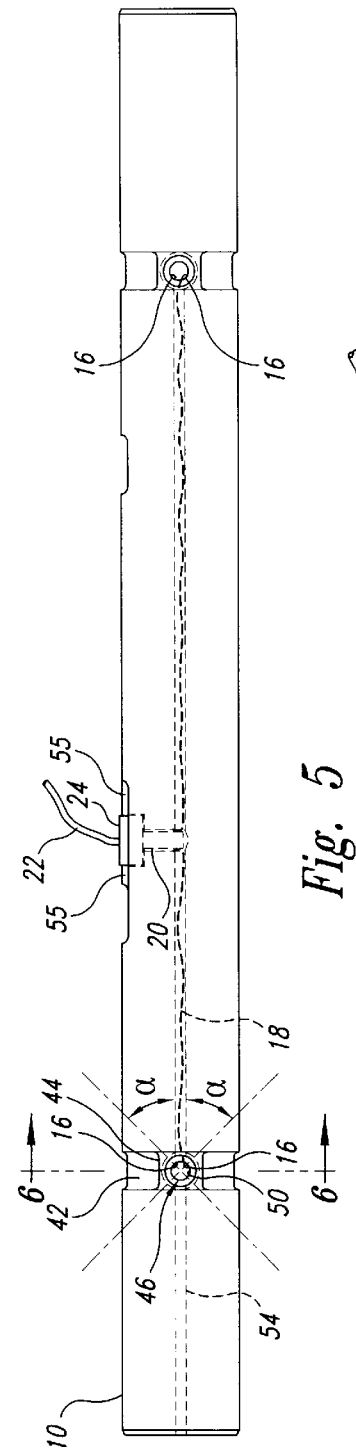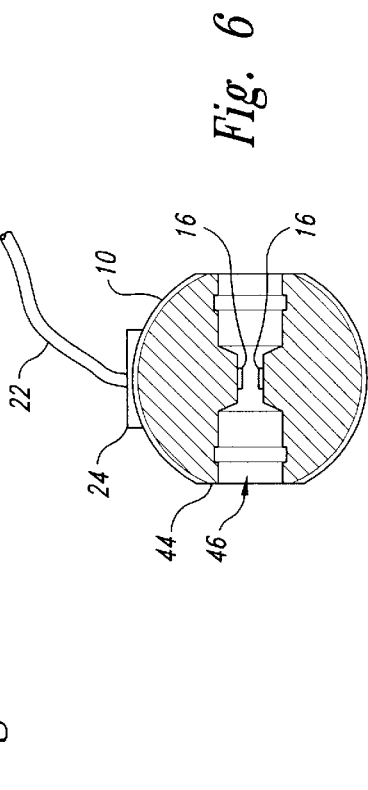

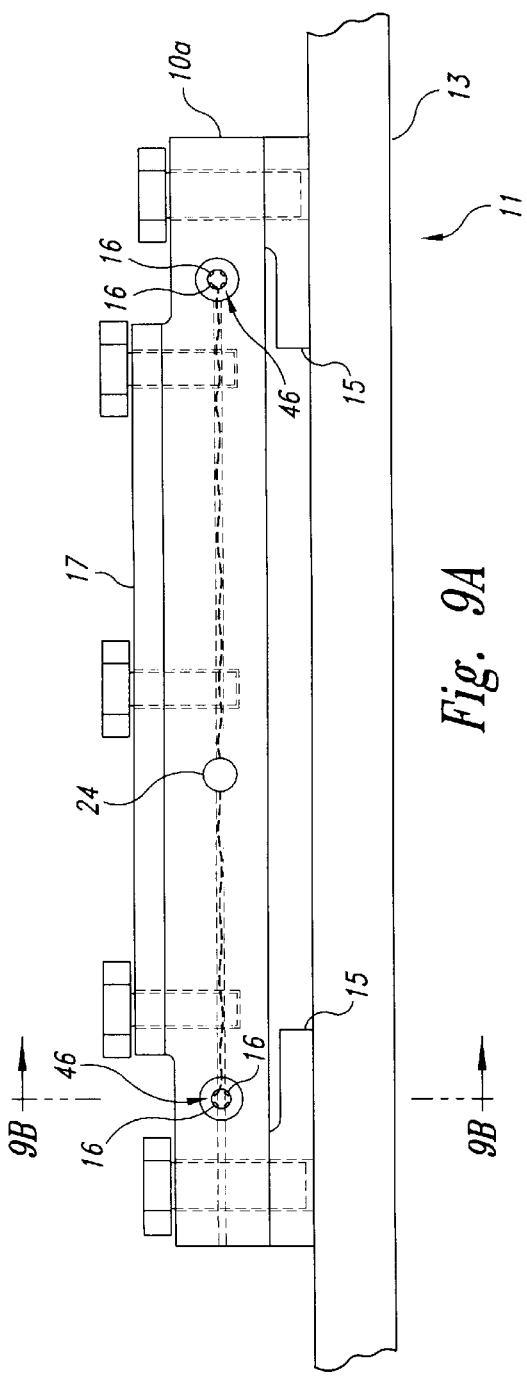
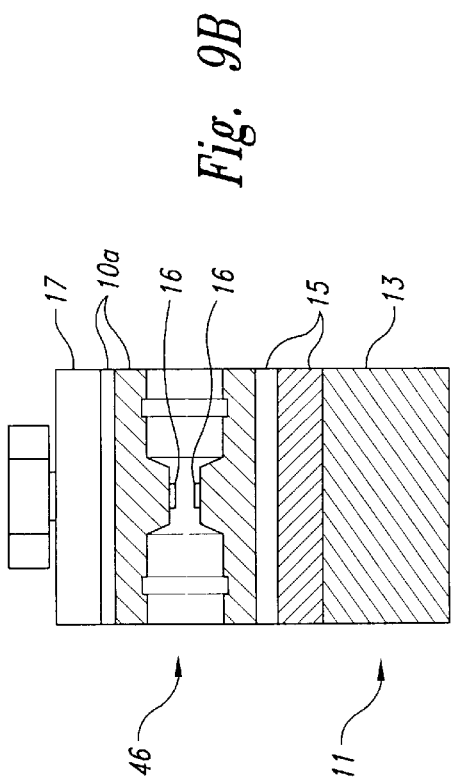
Fig. 9A
Fig. 9B

WEIGHT MEASUREMENT APPARATUS FOR VEHICLES

CROSS-REFERENCE TO RELATED APPLICATIONS

This application is a continuation-in-part of the following three applications: U.S. application Ser. No. 08/948,406, filed Oct. 10, 1997 now abandoned; U.S. application Ser. No. 08/948,099, filed Oct. 9, 1997 now abandoned; and U.S. application Ser. No. 08/948,304, filed Oct. 9, 1997 now abandoned. Each of the preceding three applications is a continuation-in-part of U.S. application Ser. No. 08/758,283, filed Nov. 8, 1996 now U.S. Pat. No. 5,811,738.

TECHNICAL FIELD

The present invention is directed toward an apparatus and method for measuring the weight of a vehicle payload.

BACKGROUND OF THE INVENTION

Operators of trucks driven on public highways must typically monitor the weight of the truck payloads to remain in compliance with the legal load limits and avoid paying substantial fines associated with violating such limits. Monitoring the payload weight is often a difficult task when the payload is placed upon the truck at a remote location, such as a logging site, construction site, gravel pit, or other location where truck scales are not easily accessible. In these situations, it is desirable to have an onboard means for measuring the weight of the payload placed upon the truck or a trailer towed behind the truck.

Various devices have previously been used to measure the weight of a payload placed upon a truck trailer. Such devices include a single point suspension scale 3, such as the one illustrated in FIG. 1. The scale may take the form of a bending beam load cell or a double-ended shear beam load cell. As shown in FIG. 1, the scale 3 is typically mounted between a frame attachment member 25 which extends downwardly from the trailer frame 11, and a frame mounting bracket 31. The frame mounting bracket 31 is attached to a conventional trunnion tube 7 which retains springs 12 and axles 14. One drawback with these scales is that they often must be welded directly to the trailer frame attachment member 25 and to the frame mounting bracket 31 at weld joints 17. The weld joints 17 are subjected to high stress as a result of the payload weight and harsh environmental conditions, such as mud, rain, sleet, and ice. As a result, the welded joints 17 tend to fail, putting the trailer out of service. The failed joints must be repaired before the trailer may be returned to service, an expensive operation made more expensive if the failure occurs in a remote environment.

A further drawback of these prior art scales is that, due to high torsional forces induced by frame bending and twisting, it has been difficult to design scales that ignore these false torsional forces and instead respond only to the vertical load force. For example, experience has indicated that simply driving the vehicle to another spot on the road has caused the scales to report a false zero shift in signal output due to torsional forces induced by the frame of the vehicle, resulting in an erroneous weight measurement. Further, these types of scales have been found to be quite sensitive to off level loading conditions. For example, if the vehicle is loaded while being positioned on a 5 to 15 degree slope, the accuracy of the weight measurement degenerates.

Another drawback of these prior art scales is that they are interposed between the trailer frame and the conventional trunnion tube 7, raising the frame above the trunnion tube. In order to avoid increasing the overall height of the trailer, a frame retrofitted with such a scale must be shortened in the region of the scale to accommodate installation of the scale. This requires cutting the frame attachment member 25, to remove the required material. This is not only an expensive and time-consuming operation but also degrades the structural integrity of the vehicle. The operation is necessary if the scale is to be welded in place, as shown in FIG. 1, and is also necessary if the scale is a replaceable unit. For example, if the scale is to be bolted to the frame attachment member 25 and the frame mounting bracket 31, material must still be removed from the attachment member and/or the mounting bracket, and mounting plates sized to receive the scale mounting bolts must be welded in place. Whether the scale is replaceable or non-replaceable, it is difficult for truck owners to accept the fact that cutting critical suspension support members of the vehicle is required for these types of onboard scale installations.

A further drawback of the present scales is that in the event of a failure of the scale itself, the scale is not easily replaceable in the field. Because the scale 3 is welded to the trailer frame attachment member 25 and to the frame mounting brackets 31, replacement of the scale requires breaking the welded joints 17 between the scale and the frame attachment member, and between the scale and the frame mounting bracket 31, and re-welding a new scale to both the frame attachment member and the frame mounting bracket. Such operations are expensive and time consuming and particularly difficult if performed in the field.

Accordingly, there is a need for an onboard truck or payload weight measurement device which does not suffer from the problems associated with existing devices. The present invention fulfills this need and provides further related advantages.

SUMMARY OF THE INVENTION

In brief, the present invention provides an apparatus for measuring the weight of a load borne by a vehicle, such as a truck, truck trailer, or truck and trailer combination. The apparatus is designed to either replace the components typically used to support the load, or the device can be part of the original equipment of the vehicle. The apparatus can be removable for purposes of maintenance, replacement, and retrofitting.

In one embodiment, the apparatus includes an elongated load bearing member having first and second opposite ends. The load bearing member further includes a first connection location proximate to the first end, a second connection location proximate to the second end, and a third connection location between the first and second connection locations. The load bearing member can be coupled between the load and a ground support member (such as a wheel) that supports the vehicle in one or more of several configurations. For example, the first and second connection locations can be coupled to the load and the third connection location can be coupled to the wheel.

The load bearing member includes first and second apertures that extend completely through the load bearing member. The first aperture is positioned between the first and second connection locations and the second aperture is positioned between the second and third connection locations. At least one load sensor is attached to a wall of the first aperture to measure the load borne by the load bearing member.

In one aspect of the invention, the load bearing member can include a plurality of strain gages positioned on the walls of the first and second apertures such that they straddle the principle stress axes of the load bearing member at the apertures. The apertures can extend through a center line of the load bearing member in a direction generally normal to a direction of the force applied by the load to the load bearing member.

The load bearing member can be attached at one or more of several locations of the vehicle. For example, where the vehicle is a dump truck, the load bearing member can be positioned between the frame of the dump truck and a dump body that is pivotable relative to the frame. In another embodiment, the load bearing member can be attached to a transfer body that is winched on and off the truck frame. In still another embodiment, the load bearing member can form a portion of the suspension of the truck, such as a trunnion member or a pivot pin that couples portions of the suspension assembly to each other and/or to the frame.

The invention also provides a method for forming a weight measurement apparatus for measuring the weight of a load borne by a vehicle. In one embodiment, the method includes forming first and second apertures in an elongated load bearing member such that the apertures extend through the load bearing member in a direction generally normal to an axis along which the load bearing member is elongated. The method can further comprise attaching at least one load sensor to a wall of one of the apertures and coupling the load bearing member between the load and a support member that supports the vehicle.

These and other aspects of the invention will become evident upon reference to the following detailed description and attached drawings.

BRIEF DESCRIPTION OF THE DRAWINGS

FIG. 4 is a detailed top view of the trunnion member of the embodiment illustrated in FIG. 3.

FIG. 5 is a detailed side view of the trunnion member of the embodiment illustrated in FIG. 3.

FIG. 6 is a cross-sectional view of the trunnion member of FIGS. 4 and 5 taken substantially along line 6—6 of FIG. 5.

FIG. 9A is a side view of a load bearing member installed on a frame of a truck in accordance with another embodiment of the invention.

FIG. 9B is a cross-sectional view of the load bearing member and frame taken substantially along line 9B—9B of FIG. 9A.

DETAILED DESCRIPTION OF THE INVENTION

Figure 1:
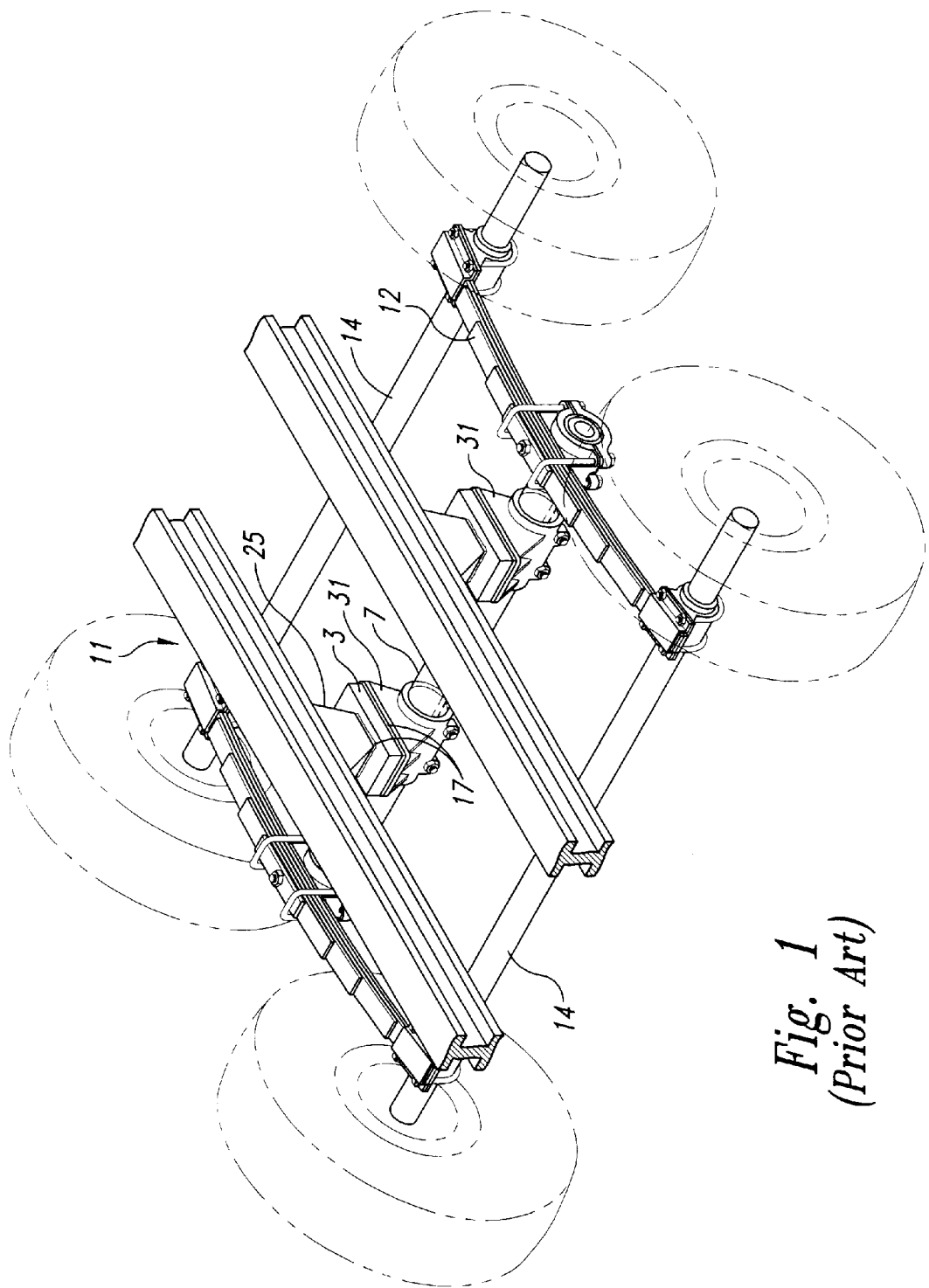
FIG. 1 is an isometric view of a prior art truck trailer weight measurement device.

As discussed above, the present invention is directed toward an onboard apparatus for measuring the weight of a truck, a truck trailer and/or a payload borne by the truck and/or trailer. In an embodiment illustrated in FIG. 2, a weight measurement apparatus 2 measures the weight transmitted by a trailer 4 and its payload 5 to the rear axles 14. A second weight measurement is preferably taken at a fifth wheel 70 by a fifth wheel mounting table 72 having replaceable load pins 78. These two measurements are transmitted to an onboard display 28 in the tractor 6 cab where they are combined to produce and display the payload weight, allowing the driver to read the trailer payload weight and avoid overloading the trailer in the field.

The weight measurement apparatus 2 is preferably removably connected to both the trailer frame 11 and the axles 14 to allow for convenient replacement of the weight measurement apparatus 2 in the event that replacement becomes necessary. In one embodiment, the weight measurement apparatus is also preferably sized and shaped to replace a conventional trunnion tube 7 (see FIG. 1), so that the apparatus may be conveniently retrofitted to an existing truck trailer.

Figure 2:
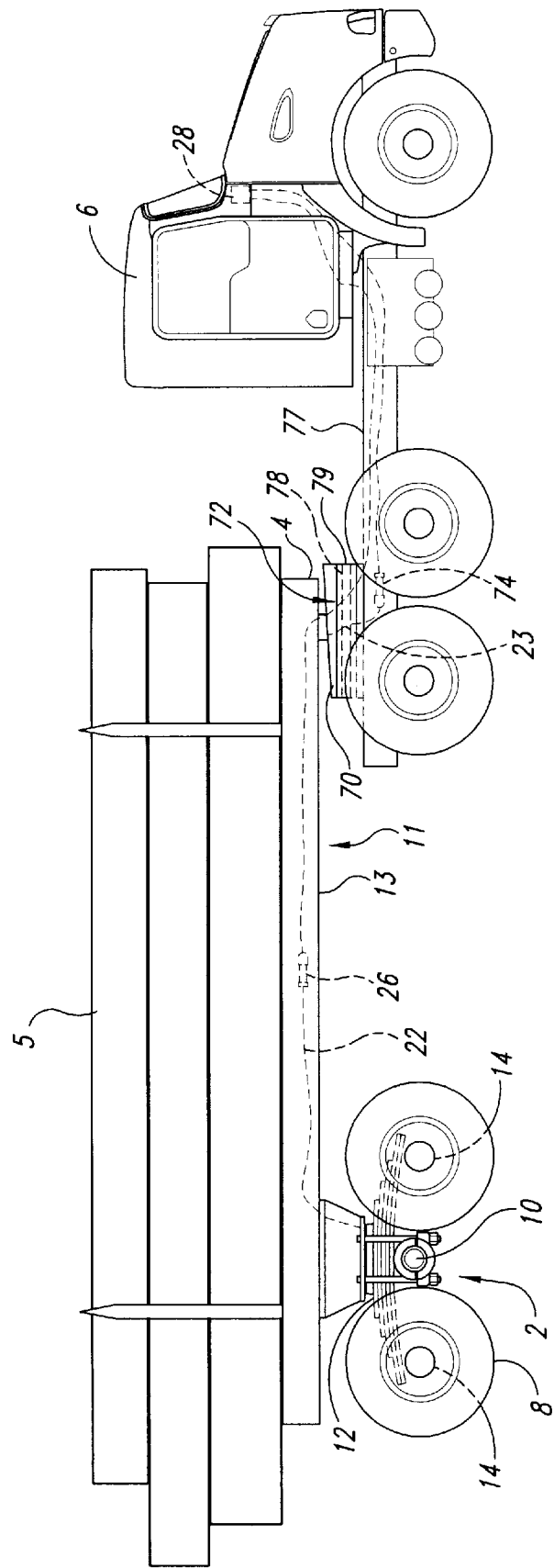
FIG. 2 is a side view of a typical truck and trailer upon which is mounted a weight measurement device in accordance with one embodiment of the present invention.

A representative weight measurement apparatus 2 in accordance with an embodiment of the present invention is shown in the figures for purposes of illustration. As shown in FIG. 2, the weight measurement apparatus 2 is installed on a trailer adapted to carry a payload 5 of logs; however, the weight measurement apparatus 2 may be installed on any typical trailer, or directly on the tractor 6 if the tractor carries the payload.

Figure 3:
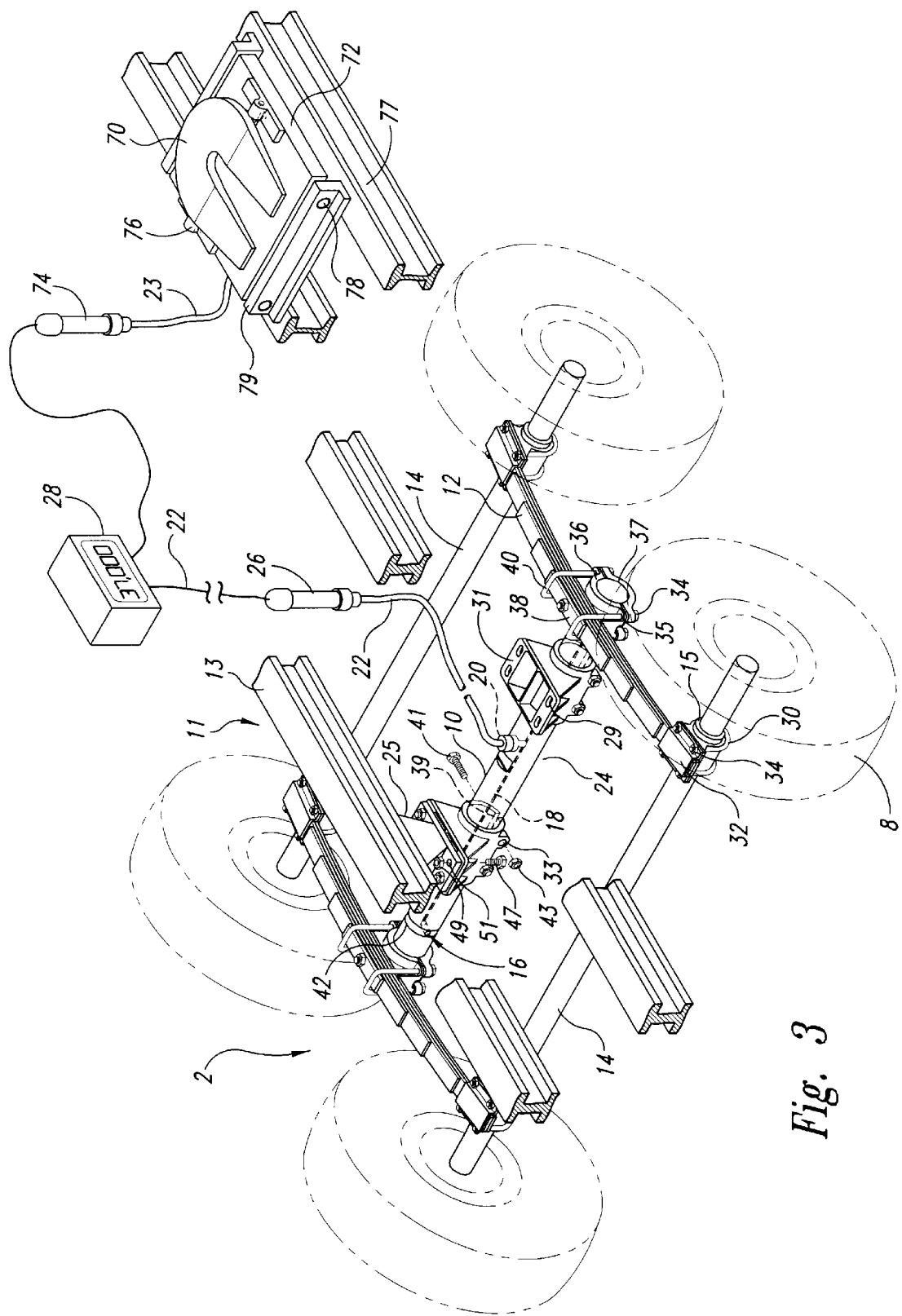
FIG. 3 is an isometric view of a trunnion-mounted weight measurement device in accordance with an embodiment of the present invention mounted to a twin axle suspension system of a truck trailer.

As shown in FIGS. 2 and 3, rear wheels 8 are suspended from the trailer 4 with suspension members 12. In one embodiment, the suspension members 12 are conventional leaf springs, as illustrated. The rear wheels 8 are connected to axles 14 which are rotatably retained by the suspension members 12. The suspension members 12 are connected to a trunnion member 10 which extends between the suspension members and is in turn connected to parallel beams 13 of the trailer frame 11. The suspension members 12 absorb shocks encountered by the wheels 8 thereby protecting the payload 5 which rests on the trailer frame 11. In other embodiments, the rear wheels 8 can be replaced with other ground support members to support the trailer 4.

As shown generally in FIG. 3 and in greater detail in FIGS. 4 through 6, the trunnion member 10 contains strain gages 16 or other load-sensing devices, which produce an analog signal indicating the weight of the trailer 4 and the payload 5 (FIG. 2) borne by the wheels 8. Leads 18 extend from the strain gages 16 to a connector block 20. A cable 22 with a connector 24 is releasably connected to the connector block 20 and transmits the strain gage signal to a decoder 26. The decoder 26 produces a digital axle weight signal and transmits the axle weight signal to a digital display unit 28 located in the tractor 6 (FIG. 2). Pin load sensors 78, which are mounted to the fifth wheel mounting table 72, generate a fifth wheel weight signal which is transmitted to the fifth wheel decoder 74. The fifth wheel decoder 74 produces a digital fifth wheel weight signal which is transmitted to the digital display 28 where it is combined with the digital axle weight signal to produce a total vehicle weight.

In a typical installation shown in FIG. 3, the axles 14 are housed in axle seats 15. Although two axles 14 are shown in the figures for purposes of illustration, the present invention may easily be installed on vehicles having more or fewer axles, as will be apparent to those skilled in the art. The axle seats 15 are rigidly mounted to the suspension members 12. In one embodiment, the axles 14 rotate relative to the axle seats 15 and in another embodiment, the axles are fixedly mounted to the axle seats and the wheels 8 are rotatably mounted to the axles. As shown in FIG. 3, the axle seats 15 are mounted to the suspension members 12 with u-bolts 30 connected to mounting plates 32 with nuts 34, although other mounting methods are possible, as will be apparent to those skilled in the art. In the embodiment illustrated in FIG. 3, the axles are positioned beneath the suspension members 12 but they may also be placed above the suspension members.

The suspension members 12 are removably connected to the trunnion member 10 with trunnion u-bolts 40 and nuts 34. The trunnion u-bolts 40 are mounted over a top plate 38 positioned above the suspension member 12. The trunnion u-bolts 40 pass through holes 35 in a trunnion upper hub 36 and a trunnion lower hub 37. The nuts 34 are threaded to lower threaded portions of the u-bolts 40 to clamp the top plate 38, the suspension member 12, the trunnion upper hub 36 and the trunnion lower hub 37 around the trunnion member 10, clamping the trunnion member to the suspension member. Although the trunnion member 10 is shown mounted beneath the suspension member 12 in FIG. 2, other embodiments in which the trunnion member is mounted above the suspension member are possible as well.

Figure 7:
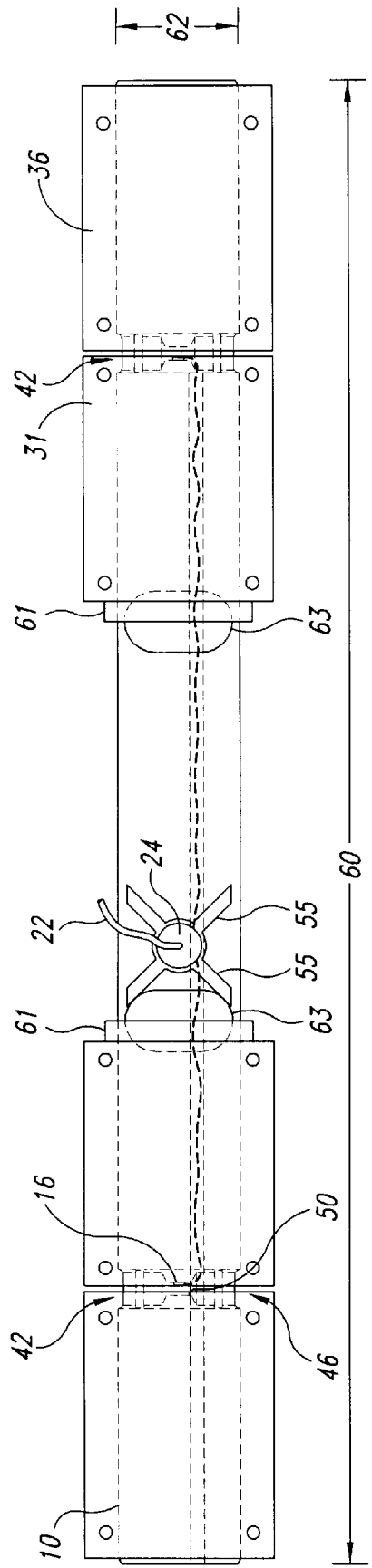
FIG. 7 is a top view of the trunnion member of the embodiment illustrated in FIG. 3, indicating the mounting positions of frame mounting brackets and trunnion hubs on the trunnion member.

The trunnion member 10 is releasably connected to the trailer frame 11 with frame mounting brackets 31 and frame attachment members 25. The frame mounting bracket 31 is split along a split line 39 on its lower edge and has mounting holes 33 positioned on opposing sides of the split line. Bolts 41 pass through the holes 33 on opposing sides of the split line 39 and are threadably connected to nuts 43 to clamp the trunnion member 10 to the frame mounting bracket 31. The frame mounting bracket 31 is then releasably connected to the frame attachment member 25 by frame bolts 47 which pass through holes 29 in the frame mounting bracket and holes 51 on the frame attachment member. Nuts 49 are threadably connected to the bolts 47 to secure the frame mounting bracket 31 to the frame attachment member 25. The frame mounting bracket 31 is shown spaced a substantial distance from the trunnion upper hub 36 and lower hub 37 for purposes of illustration. In actual installation, the frame mounting bracket 31 is spaced approximately $\frac{1}{16}$" from the trunnion hubs 36 and 37, as indicated in FIG. 7.

An important aspect of an embodiment of the present invention illustrated herein is that the trunnion member 10 is releasably coupled to both the frame members 11 and the suspension members 12. The releasable couplings allow the trunnion member to be easily replaced if necessary, in an operation which can be conducted in the field. Although the trunnion member 10 is connected to the frame members 11 and suspension members 12 with bolts, nuts and mounting plates in the illustrated embodiment, other mounting methods which permit quick release and reattachment are possible, as will be apparent to those skilled in the art. As shown in FIG. 3, the trunnion member 10 has a substantially cylindrical external shape for mounting with the mounting hardware discussed above. Therefore, in alternate embodiments, the trunnion member 10 may be mounted with any mounting hardware adapted to retain a cylindrical shape.

In further alternate embodiments of the present invention, the trunnion member 10 has non-cylindrical shapes. For example, the trunnion member 10 may have a rectangular rather than circular cross-sectional shape. In these embodiments, the trunnion member 10 may be mounted with any mounting hardware adapted to retain the selected cross-sectional shape of the trunnion member.

In a typical factory installation a trailer is supplied with a conventional trunnion tube 7 (FIG. 1) which is hollow and cylindrical in shape. In the preferred embodiment of the present invention illustrated herein, the trunnion member 10 has been adapted to produce a weight measurement signal. However, the overall dimensions of the trunnion member 10 are commensurate with the factory installed trunnion tube 7 to allow for convenient retrofitting. As discussed above, the trunnion member 10 may be used with any trailer having hardware adapted to retain a conventional trunnion member 7.

The details of the trunnion member 10 are best seen in FIGS. 4 through 6. In a preferred embodiment, the trunnion member 10 is generally cylindrical and solid and has circumferential grooves 42 and flat regions 44 located toward each end. The grooves 42 serve to concentrate the stress borne by the trunnion member 10 in the end regions of the trunnion member where the strain gages 16 are installed. The grooves 42 also prevent the surface of the trunnion member 10 from being directly loaded at the axial location where the strain gages 16 are installed, which may adversely affect the strain gage measurement. Instead, the loads are applied to the trunnion member 10 to the left or right (as seen in FIGS. 4 and 5) of the grooves 42. Flat regions 44 provide a locally flat portion of the otherwise cylindrical trunnion member 10 which can improve the uniformity of the stress concentrated in the end regions of the trunnion member.

As best seen in FIGS. 4 through 6, two bores or apertures 46 extend completely through the trunnion member 10 near each end. The apertures 46 can be positioned within the edges of the grooves 42 in a preferred embodiment. In the embodiment shown in FIGS. 4–6, the apertures 46 can have a smaller diameter near the center of the trunnion member 10 than at the external surface of the trunnion member 10. In other embodiments, the apertures 46 can have constant diameters. The strain gages 16 are mounted to aperture walls 50 of each aperture 46 to measure the shear force on the walls. The electrical signals generated by the strain gages 16 are transmitted by leads 18 which in one embodiment are routed through a hole 54 through the trunnion member 10 and are connected to the connector block 20. In another embodiment, the hole 54 can be replaced with a groove in the side of the trunnion member 10. The connector 24 with the cable 22 is releasably attached to the connector block 20 and transmits the strain gage signals to the decoder 26 (FIG. 3), as discussed previously. The connector 24 and the connector block 20 may be any of a variety of sealable, quick release connector combinations known in the art. In a preferred embodiment, the connector 24 is countersunk into the surface of the trunnion member 10 to protect the connector. As shown in FIG. 4, the trunnion member 10 can also include channels 55 that radiate outwardly from the connector block 20 to convey liquids and other debris away from the electrical connections between the connector 24 and the connector block 20.

The strain gages 16 are typically placed in an area of the beam where there is little bending action and where the shear forces are concentrated as a result of the groove 42 and uniform as a result of the flat regions 44. What bending forces there are would typically be canceled by the use of a bridge circuit so that the resulting force measured by the strain gages is substantially a shear force only. The use of such circuits is well known in the art. The shear forces measured at each aperture 46 are added to calculate the total weight borne by the trunnion member 10. The shear forces at the apertures 46 may be the same or may be different. For example, when the load 5 is centered between the wheels 8 located on opposite sides of the trailer 4 (FIG. 2), the shear force present at each aperture 46 is equal to half the load borne by the trunnion ember 10. When the load 5 is located off-center, the shear forces in each aperture 46 differ; however, this does not affect the accuracy of the shear force measurement or the accuracy of the calculated weight borne by the trunnion member.

The strain gages 16 must be in intimate contact with the aperture walls 50 in order to accurately measure the local shear force. Typically, the gages are adhesively bonded to the aperture walls 50 using high strength adhesives such as Mbond 610, a heat cured epoxy adhesive supplied by Measurements Group, Inc. of Raleigh, N.C. Other high strength adhesives and other mounting methods which produce the required intimate contact are possible as well. Once the strain gages 16 are installed, the apertures 46 and the hole 54 may be filled in with potting material to protect the strain gages 16 and leads 18 from environmental hazards such as chemicals, dirt and moisture. Typically, wax and/or polyurethane is applied directly to the strain gages 16 to seal them from moisture, and epoxy or polysulfide is used to fill in the remainder of the apertures 46 and the hole 54. Other suitable potting materials known to those skilled in the art are possible as well.

Figure 8:
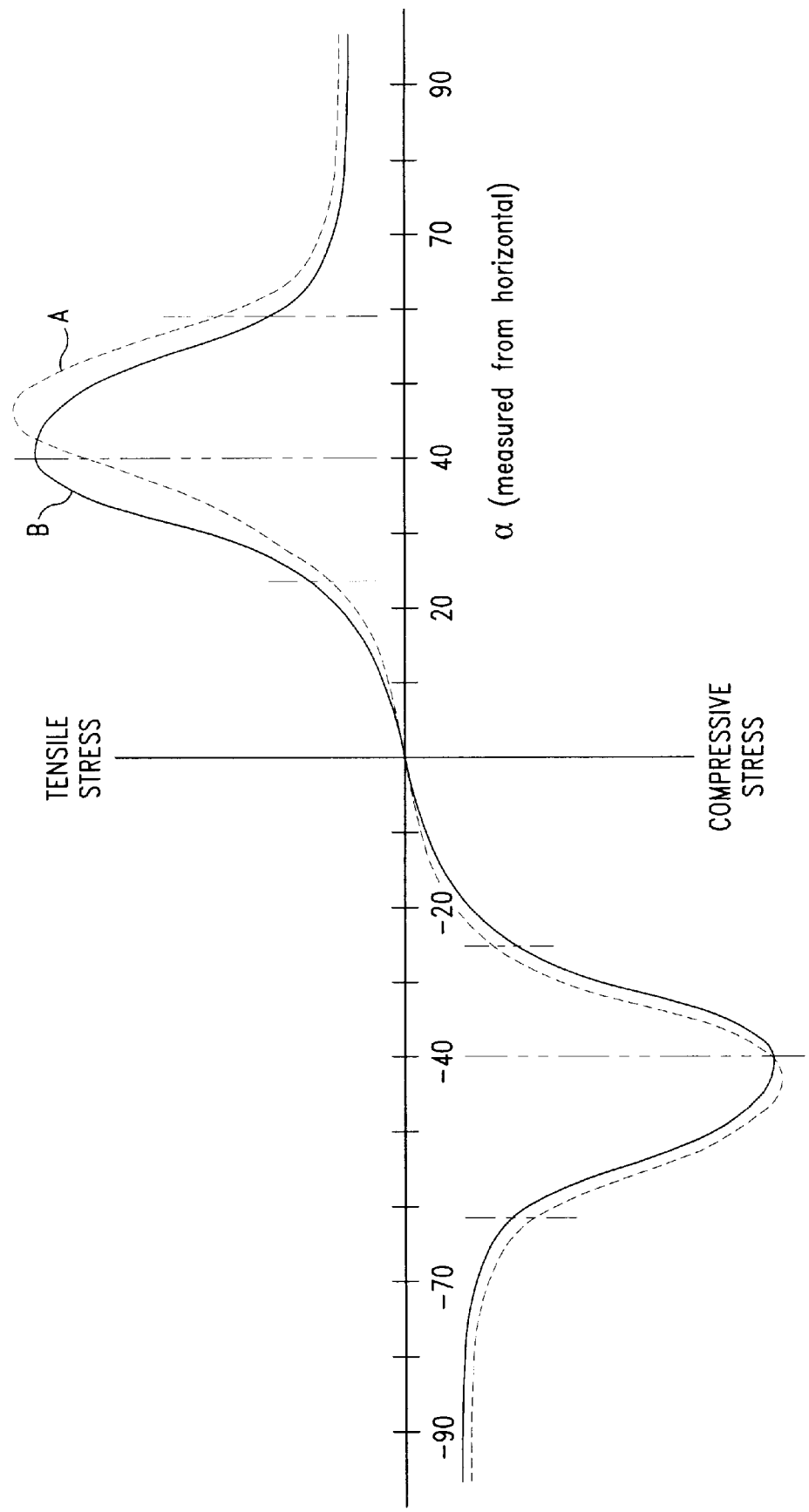
FIG. 8 is a representative graph of the stress at the walls of an aperture through the weight measurement device illustrated in FIG. 3.

The strain gages 16 are preferably mounted to the aperture walls 50 at selected circumferential locations (indicated by angle α in FIG. 5) that are aligned with principal stress axes of the trunnion member 10. For example, FIG. 8 is a graph showing compressive and tensile stresses at the aperture walls 50 as a function of angle α. In an ideal case, where the diameter of the aperture 46 is infinitesimally small, the maximum compressive and tensile stresses occur at an angle α of 45 degrees relative to horizontal (as seen in FIG. 5), as indicated in FIG. 8 by line A. When the apertures 46 have a finite diameter at the center of the trunnion member 10 of approximately 0.438 inches and the overall diameter of the trunnion member 10 is 4.0 inches, the maximum stresses occur at an angle α of approximately 40 degrees relative to horizontal (or 50 degrees relative to the vertical direction in which the load is applied to the trunnion member 10), as indicated in FIG. 8 by line B. Accordingly, the angle α of maximum stress decreases as the diameter of the apertures 46 increases relative to the diameter of the trunnion member 10.

In a preferred embodiment, each aperture 46 includes two strain gages 16 or other load sensing devices on one side of the aperture 46, one above the centerline of the trunnion member 10 and one below the centerline of the trunnion member 10. Each strain gage 16 straddles an axis of maximum stress, as is best seen in FIG. 5. In alternate embodiments, the trunnion member 10 can include more or fewer strain gages 16. For example, the trunnion member 10 can include a single strain gage 16 straddling one of the axes of maximum stress, or four strain gages straddling both axes of maximum stress on opposite sides of the aperture 46 (see, for example, FIG. 9A). In any case, by straddling an axis of maximum stress, each strain gage 16 will measure the maximum stress at the aperture 46, even if the strain gage is not centered directly on the axis. In other embodiments, the trunnion member 10 can have more or fewer strain gages 16, and/or more or fewer apertures 46. In a further aspect of the embodiment shown in FIGS. 4–6, each aperture 46 is centered on the center line of the trunnion member 10. In other embodiments, the apertures 46 can be centered above or below the center line, so long as the strain gages 16 straddle the axes of maximum stress. In still further embodiments, the strain gages 16 can be positioned off the axes of maximum stress so long as the load measurements indicated by strain gages in such positions are corrected to account for their off-axes locations.

Operation of an embodiment of the trunnion member 10 is best understood with reference to FIG. 3. In one embodiment, the trunnion member 10 replaces an existing conventional trunnion member or may be installed during manufacture of the trailer 4 (FIG. 2) and associated suspension elements. The trunnion member 10 is positioned so that the frame attachment members 25 and mounting brackets 31 are attached to the trunnion member at locations inward from the grooves 42 and the trunnion hubs 36 and 37 are mounted outward of the grooves 42. The mounting brackets 31 and the trunnion hubs 36 can be separated by a gap of approximately $\frac{1}{16}$" and the gap is centered over the circumferential groove 42 (FIG. 7). In addition, bars 61 can be attached to the mounting brackets 31 so as to engage flats 63 of the trunnion member 10 and prevent the trunnion member 10 from rotating (FIG. 7). In this manner, the load borne by the trunnion member 10 is positioned between the supports provided by the leaf springs 12, axles 14 and wheels 8.

When the trunnion member 10 is subjected to a stress, for example, when payload 5 is loaded on the trailer 4 (FIG. 2), the trunnion member flexes and the stress in the trunnion member is concentrated at the apertures 46. The strain gages 16 generate an electrical signal which is proportional to the stress and transmit the signal to the decoder 26. The decoder 26 produces a digital signal from the analog electrical signal received from the strain gages 16, and transmits the signal to the digital display 28.

Although the embodiment illustrated in FIG. 3 shows the axles 14 mounted to the trunnion tube 10 outward of the grooves 42 and the frame members 11 mounted to the tube inward of the grooves 42, other embodiments are possible as well, so long as the shear forces present in the apertures 46 accurately represent the load borne by the trunnion member 10. For example, the mounting positions of the frame attachment members 25 and axles 14 to the trunnion member 10 may be reversed so that the frame attachment members are mounted outward of the grooves 42 and the axles are mounted inward of the grooves 42. In this manner, the weight of the payload is cantilevered on the ends of the trunnion tube 10. Such an installation will not affect the accuracy of the resulting weight measurement.

In a preferred embodiment the trunnion member 10 has an overall length 60 (FIG. 7) of 48 inches and a diameter 62 (FIG. 7) of 4 inches, for installation on a typical heavy duty, twin axle trailer. The apertures 46 have a diameter at the centerline of the trunnion member 10 of approximately 0.438 inches and a diameter at the surface of the trunnion member 10 of approximately 1.250 inches and are suitable for installation on vehicles having a gross weight of approximately 85,000 pounds and a payload weight of approximately 60,000 pounds. However, the invention is not so limited and other load cell sizes for installation on load-bearing vehicles having greater or lesser gross weights and capacities are possible as well.

As illustrated in FIG. 2, the fifth wheel releasably retains a connection portion of the trailer 4, permitting the tractor 6 to pull the trailer as well as bear a portion of the trailer weight. As shown in FIG. 3, the fifth wheel 70 is pivotally mounted to doughnuts 76 which are in turn mounted to the fifth wheel mounting plate 72. The fifth wheel mounting plate 72 contains pin load cell members 78 which project outwardly therefrom and which operate in a fashion similar to the trunnion member 10. The pin load cell members 78 are positioned such that the ends of the pin load cell members projecting from the fifth wheel mounting plate 72 are connected to plate mounting brackets 79 which are in turn welded to the tractor frame 77. In this manner, the load borne by the fifth wheel 70 and the fifth wheel mounting plate 72 is suspended between the plate mounting brackets 79 by the pin load cell members 78. Strain gages located in the pin load cell members 78 transmit a stress signal via a cable 23 to the fifth wheel decoder 74, the signal representing the weight placed upon the fifth wheel 70 by the trailer 4. The fifth wheel decoder 74 converts the analog signal to a digital signal which is transmitted to the digital display 28 located in the tractor. The digital display computes the trailer weight based on the weight measured at the fifth wheel mounting plate 72 and the trunnion member 10, and displays the weight to the user.

In one embodiment of the invention, the decoder 26 may include digitizing and transmitting apparatus such as disclosed in U.S. Pat. No. 5,007,042 which is incorporated herein by reference. In a further embodiment, the invention includes a complete truck weight measuring system, such as the model LM150P, produced by Creative Microsystems of Renton, Wash. Such a system includes an LC6000 trunnion member, an LC100S decoder for measuring axle loads, an LC5000 mounting table and LC101D mounting table decoder for measuring fifth wheel loads and an LM100P onboard meter for integrating the calculated loads and digitally displaying the load to the user. The onboard meter is also capable of integrating the empty weight of the truck with the measured weights to produce the truck total gross weight.

An advantage of the trunnion member 10 shown in FIGS. 2–7 is that it can be sized to replace an existing trunnion member, thereby adding a weight measurement capability to a truck which does not initially have such a capability. Another advantage is that positioning the strain gages 16 on the aperture walls 50 of the apertures 46 can more accurately measure the weight borne by the trunnion member 10 than other conventional devices. This feature may be particularly advantageous where the truck frame 11 has a tendency to twist, for example, if the frame is positioned on uneven ground, or if the frame is inherently somewhat flexible. Still another advantage is that, by placing the apertures 46 and the strain gages 16 within the width of the grooves 42, the trunnion member 10 can more accurately measure the weight borne by the trunnion member by offsetting the load from the strain gages. Accordingly, the strain gages are not loaded directly in the vertical plane that they occupy. Instead, the trunnion member 10 allows the strain gages to measure the weight in the form of a shear load placed on the aperture walls 50.

Yet another advantage of the trunnion member 10 is that the apertures 46 can be configured to both increase the accuracy of the trunnion member and ease manufacture of the trunnion member. For example, the apertures 46 can have a relatively small diameter near the centerline of the trunnion member 10 to place the strain gages 16 closer to the centerline, and can have a larger diameter at the surface of the trunnion member to make installing the strain gages easier.

FIG. 9A is a side view of a load bearing member 10a mounted to the frame 11 of a truck, in accordance with another embodiment of the invention. As shown in FIG. 9A, the load bearing member 10a can be connected with bolts or other means to spaced-apart bearing plates 15, which are in turn attached to one of the parallel beams 13 of the frame 11. A bolster plate 17 is connected to an upper surface of the load bearing member 10a and extends between the load bearing member 10a and a similar load bearing member attached to the other parallel beam 13 of the frame 11 (FIG. 3). A load 5 (FIG. 2) can then be attached to the bolster plate 17. The load bearing member 10a includes two apertures 46, each having strain gages 16 or other load sensing devices oriented and attached in a manner similar to that discussed above with reference to FIGS. 4–8.

FIG. 9B is a cross-sectional view of the load-bearing member 10a shown in FIG. 9A and indicates that the load bearing member 10a has a generally rectangular cross-sectional shape. Accordingly, the load bearing member 10a can be easily installed between portions of the truck having flat surfaces, such as the beams 13 and the bolster plate 17. In other embodiments, the load bearing member 10a can be installed between other components of the truck that are flat, parallel, and located in the load path between the load 5 (FIG. 2) and the wheels 8 (FIG. 2) of the truck. In still further embodiments, the load bearing member 10a can have other cross-sectional shapes adapted to fit between truck components having other than flat parallel surfaces.

Figure 10:
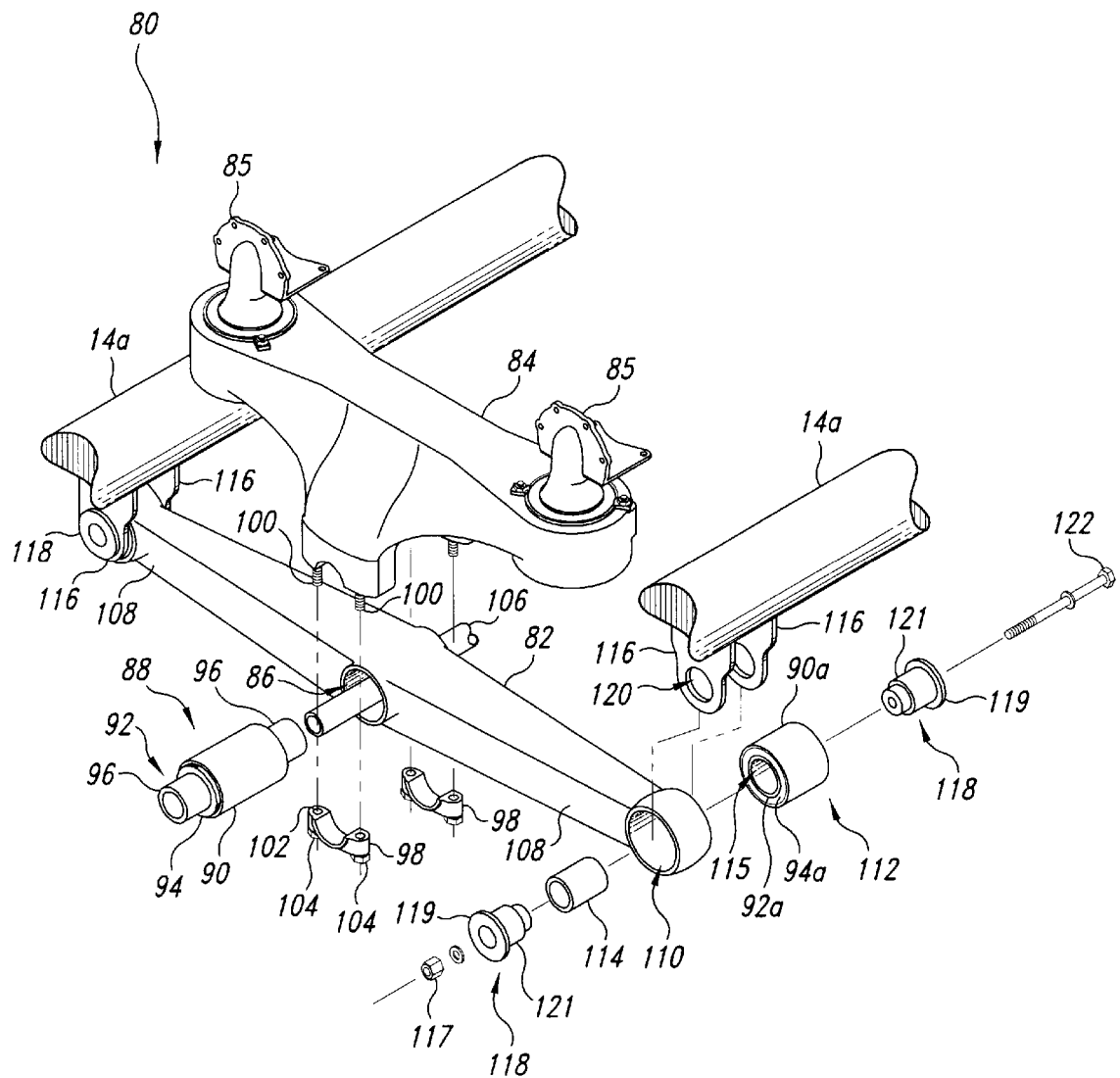
FIG. 10 is a partially exploded isometric view of a suspension assembly having end bushings and a center bushing suitable for installation of weight measurement apparati in accordance with alternate embodiments of the present invention.

FIG. 10 is a partially exploded isometric view of a suspension assembly 80, suitable for installation of weight measurement apparati in accordance with alternate embodiments of the invention. The suspension assembly 80 may be installed in place of one or both of the dual axle arrangements shown in FIG. 2 at the rear of the trailer 4 and the rear of the cab 6, and may also be installed on trucks comprising a single unit. The suspension assembly 80 comprises two axles 14a having wheels (not shown) rotatably connected to each end thereof. The axles 14a are connected to a central member or walking beam 82 that extends transversely between the axles. The central member 82 is pivotally connected to a saddle assembly 84 which is in turn fixedly connected with frame brackets 85 to the truck frame 77 (FIG. 3), trailer frame 11 (FIG. 3), or other payload bed. The central member 82 allows each axle 14a to pivot upwardly or downwardly relative to the frame and relative to the other axle, for example when the wheels attached to one axle pass over a raised obstruction. The suspension assembly 80 may comprise two axles 14a as shown in FIG. 10 and may comprise more than two axles in other embodiments.

The central member 82 includes a center aperture 86 which passes therethrough. A center bushing 88 is mounted within the center aperture 86 and comprises an outer sleeve 90 and an inner sleeve 92 positioned concentrically inwardly of the outer sleeve. A flexible insert 94 is positioned between the outer sleeve 90 and the inner sleeve 92. The flexible insert 94 may be formed from rubber or other resilient, flexible materials which tightly engage both the outer and inner sleeves.

The inner sleeve 92 includes two end portions 96 which project out of the center aperture 86 on either side of the central member 82 when the center bushing 88 is inserted in the center aperture. The end portions 96 are tightly clamped to the saddle assembly 84 to fix the inner sleeve to the saddle assembly. Accordingly, the saddle assembly 84 includes mounting studs 100 that extend downwardly from the saddle assembly 84 and caps 98 which have mounting holes 102 extending therethrough, sized to receive the mounting studs 100. Nuts 104 are threadably connected to the studs 100 to urge the caps 98 toward the saddle assembly 84, clamping the end portions 96 therebetween. When the center bushing 88 is mounted in the center aperture 86 and clamped to the saddle assembly 84, the inner sleeve 92 firmly engages the saddle assembly, while the outer sleeve 90 firmly engages the inner walls of the center aperture 86. The flexible insert 94 allows the inner and outer sleeves 92 and 90 to rotate slightly with respect to each other so that the central member 82 can pivot about the center bushing 88.

In one embodiment, the center bushing 88 may further include a center tube 106 which extends between the central member 82 shown in FIG. 8 and a second central member (not shown) which is mounted to the opposite ends of the axles 14a. The center tube 106 may be positioned between the two central members 82 to prevent the central members 82 from spreading apart during operation.

The axles 14a are mounted to end portions 108 of the central member 82. Each end portion 108 has an end aperture 110 which extends through the end portion and houses an end bushing 112. The end bushing 112 comprises an outer sleeve 90a, an inner sleeve 92a positioned concentrically inwardly of the outer sleeve, and a flexible insert 94a positioned intermediate the outer and inner sleeves. The end bushing 112 is inserted into the end aperture 110 and a central collar 114 is inserted into a bushing aperture 115 of the end bushing. The axle 14a is then positioned relative to the end bushing 112 such that axle mounts 116 extend downwardly on either side of the end aperture 110. Coupling members or end collars 118 are then inserted into apertures 120 of the axle mounts 116 so that flanges 119 of the end collars engage the axle mounts while a body portion 121 extends part-way into the end bushing 112 and the central collar 114. A bolt 122 passes through the end collars 118, central collar 114, and bushing 112 and is fastened to a nut 117 to couple the axle 14a to the central member 82. The flexible insert 94a permits the inner sleeve 92a of the end bushing to rotate slightly relative to the outer sleeve 90a, allowing the axles 14a to pivot relative to the central member 82.

Figure 11:
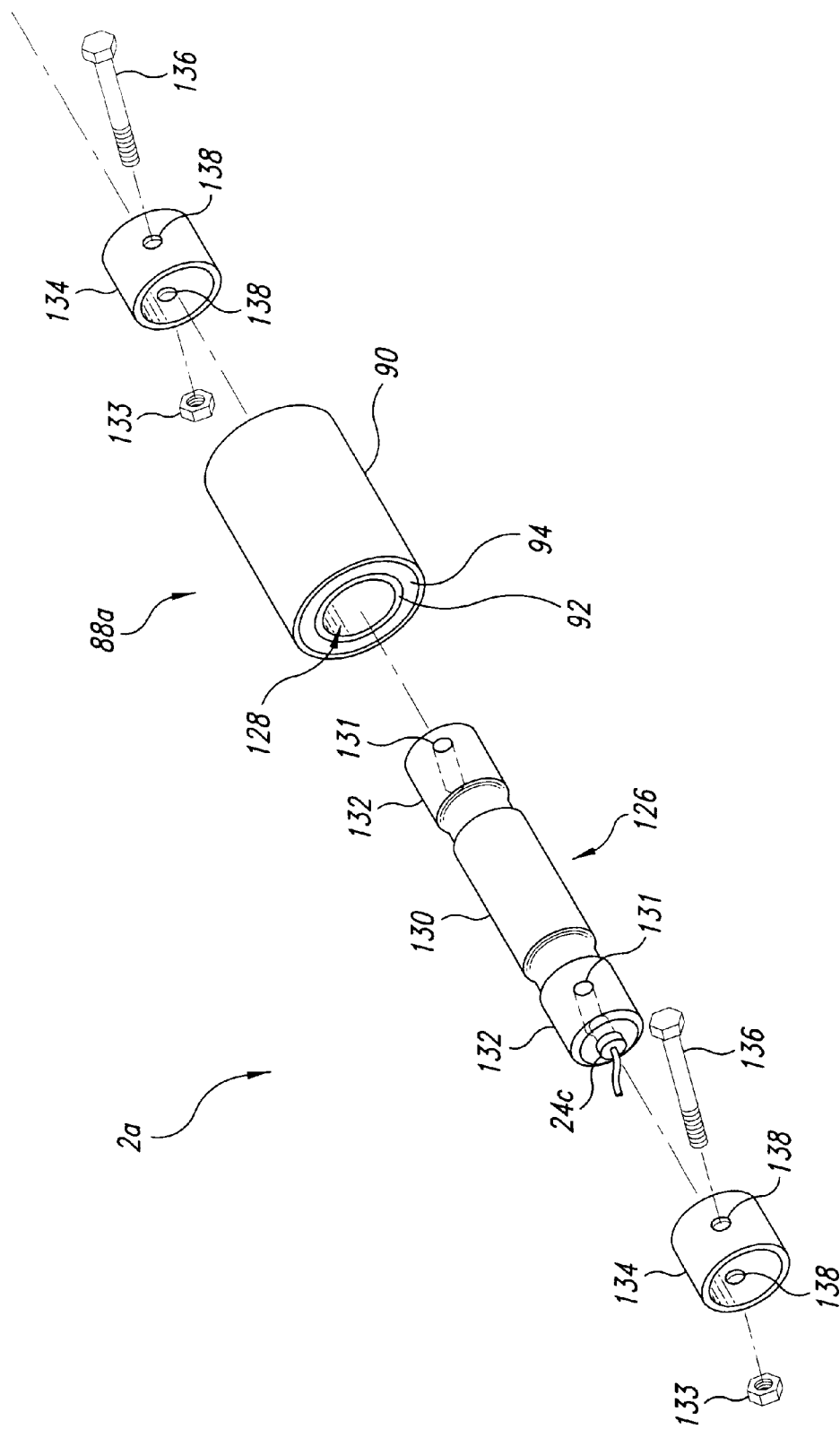
FIG. 11 is an exploded isometric view of a weight measurement apparatus having a pivot member in accordance with a first alternate embodiment of the invention.

FIG. 11 is an isometric view of a weight measurement apparatus 2a comprising a replacement center bushing 88a adapted to retain a central pivot member 126. The central pivot member 126 is configured to detect the weight placed upon it, as will be discussed in greater detail below. The replacement center bushing 88a and central pivot member 126 together are configured to replace the center bushing 88 shown in FIG. 10 and provide the suspension assembly 80 with a weight measuring capability.

As shown in FIG. 11, the replacement center bushing 88a comprises an outer sleeve 90, an inner sleeve 92 and a flexible insert 94 arranged in substantially the same manner as the components of the center bushing 88 shown in FIG. 10, except that the end portions 96 are omitted. Referring to FIGS. 10 and 11, the central pivot member 126 is positioned within an aperture 128 of the replacement center bushing 88a such that a central region 130 of the central pivot member is housed within the replacement center bushing and end regions 132 of the central pivot member project outwardly beyond the replacement center bushing. In a preferred embodiment, the central pivot member 126 is sized to fit slidably within the aperture 128 so that it may rotate relative to the inner sleeve 90. In an alternate embodiment, the central pivot member 126 may fit snugly within the inner sleeve 90 and the flexible insert 94 may flex to account for any relative motion between the central pivot member 126 and the outer sleeve 90.

The replacement center bushing 88a with the pivot member 126 positioned therein is then inserted into the center aperture 86 of the central member 82 (FIG. 10). For installations which include a center tube 106, the center tube may be removed or replaced with an alternate pivot member, as will be discussed in greater detail below with reference to FIG. 14. End collars 134 are inserted over the end regions 132 of the central pivot member such that collar mounting holes 138 are aligned with pivot member mounting holes 131 which pass completely through each end region of the central pivot member 126. Bolts 136 are inserted through the apertures 138 and 131 and threadably engage nuts 133 to tightly secure the end collars 134 to the central pivot member 126. In one embodiment, the end collars 134 are formed by severing the end portions 96 of the inner sleeve 92 (FIG. 10) from the remainder of the inner sleeve, allowing the user to form the replacement center bushing 88a and end collars 134 from the original end bushing 88. In another embodiment, the end collars 134 and replacement center bushing 88a comprise separately manufactured articles. In either case, the end collars 134 are clamped to the saddle assembly 84 using the caps 98 in a manner similar to that discussed above with reference to the end portions 96 of the inner sleeve 92. Accordingly, the central pivot member 126 is supported in its central region 130 by the central member 82 while the load borne by the truck frame is transmitted through the saddle assembly 84 to the end regions 132.

In the embodiment shown in FIGS. 10–11, both end regions 132 of the central pivot member 126 are coupled to the saddle assembly 84. In an alternate embodiment, only one of the end regions 132 is coupled to the saddle assembly 84 so that the load borne by the truck frame is cantilevered on the one end region 132. As discussed previously with reference to the trunnion member 10, such an installation will not affect the accuracy of the weight measured by the central pivot member 126.

In a further alternate embodiment, the central pivot member may be pivotally connected to the saddle assembly 84 and rigidly connected to the central member 82. Accordingly, the saddle assembly 84 may be configured to pivotally engage the end regions 132 of the central pivot member 126, while the central region 130 of the central pivot member is fixedly engaged with the replacement center bushing 88a. In this further alternate embodiment, the central pivot member 126 remains positioned to measure the weight of the load borne by the central member 82, as discussed above, and maintains the pivotal connection between the central member and the saddle assembly 84, allowing the central member to pivot relative to the saddle assembly and vehicle frame. Bushings may be provided in this further alternate embodiment between the end regions 134 and the saddle assembly 84 to reduce frictional wear on the end regions.

Figure 12A:
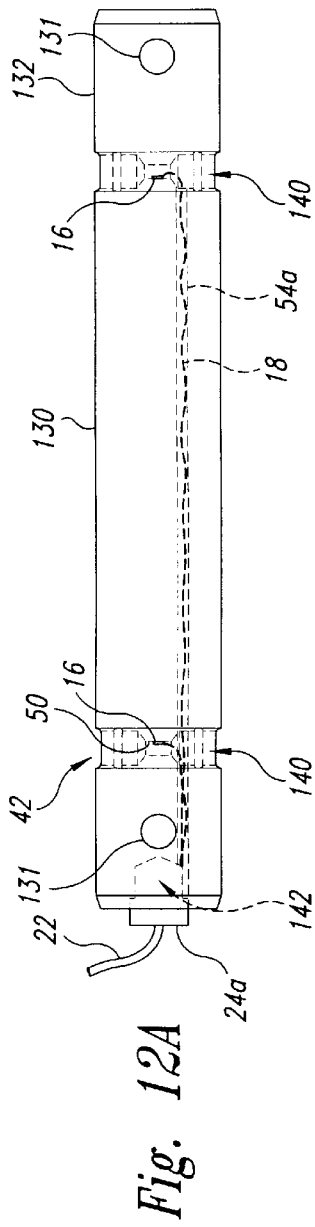
FIG. 12A is a top plan view of the pivot member shown in FIG. 11.
Figure 12B:
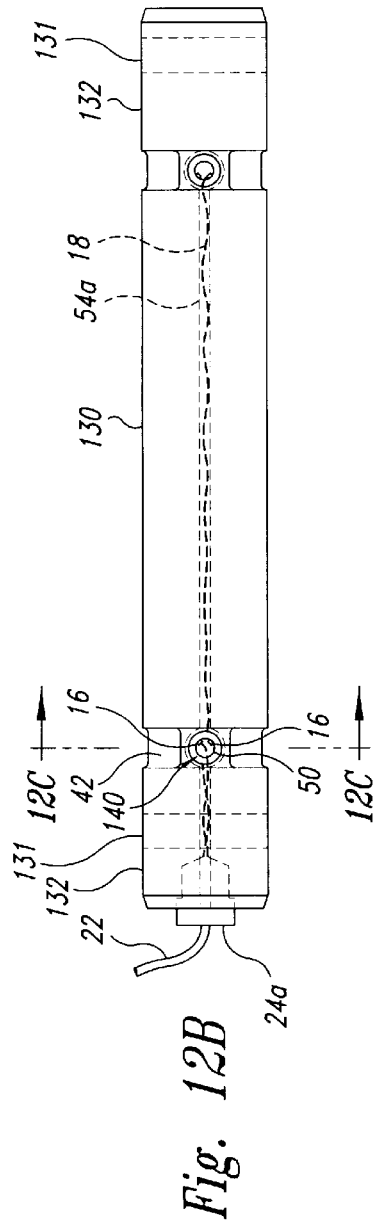
FIG. 12B is a side view of the pivot member shown in FIG. 11.
Figure 12C:
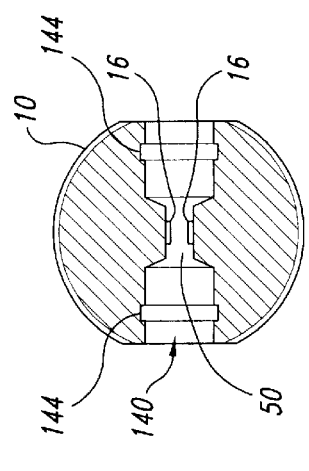
FIG. 12C is a cross-sectional view of the pivot member shown in FIG. 12B taken substantially along the line 12C—12C of FIG. 12B.

The central pivot member 126 is preferably configured with strain gages in a manner similar to the strain gage configuration of the trunnion member 10 discussed previously with reference to FIGS. 4–6, and discussed in greater detail below with reference to FIGS. 12A–C. FIG. 12A is a detailed top view of the central pivot member 126 shown in FIG. 11. FIG. 12B is a detailed side view of the central pivot member 126 shown in FIG. 12A, and FIG. 12C is a cross-sectional view of the central pivot member taken substantially along line 12C—12C. Referring to FIGS. 12A–C, the central pivot member 126 has two apertures 140 adjacent each end region 132. The bores extend completely through the central pivot member 126. At least one circumferential groove 42 is machined into the surface of the central pivot member 126 between the end regions 132 and the central region 130 to concentrate in the apertures 140 the stress borne by the central pivot member, as discussed previously with reference to the trunnion member 10. In a preferred embodiment, a width of the circumferential groove 42 is greater than a diameter of the aperture 140.

Strain gages 16 are positioned on the aperture walls 50 of the apertures 140 to measure the strain at the apertures. A wire bore 54a is provided between the apertures 140 and between one of the apertures 140 and a connector aperture 142. Leads 18 are routed from the strain gages 16, through the wire bore 54a and to the connector aperture 142 where they are coupled to a connector 24a positioned therein. The connector 24a may be coupled with the cable 22 to the decoder 26 and display 28, substantially as shown in FIG. 3.

In a preferred embodiment, the apertures 140 include potting grooves 144. The potting grooves 144 and bores 140 are filled with a potting material after the strain gages 16 have been installed on the aperture walls 50 to protect the strain gages from environmental hazards, as discussed previously with reference to FIGS. 4–6. The potting material engages the potting grooves 144 so as to prevent the potting material from sliding out of the apertures 140.

In operation, the central pivot member 126 is installed on the suspension assembly 80 in a manner substantially as described above with reference to FIGS. 10–12. The central pivot member 126, when installed and connected to the decoder 26 and display 28 (FIG. 3), measures the weight transmitted by the saddle assembly 84 to the central member 82 and displays the weight value to the operator. Where the suspension assembly 80 comprises more than one central member 82, a central pivot member 126 and replacement center bushing 88a may replace each center bushing 88. Alternatively, a single central pivot member 126 may be installed in place of a single center bushing 88 and the weight value measured by the central pivot member increased proportionately to account for the portion of the load borne by the remaining center bushing or bushings.

An advantage of the central pivot member 126 described above is that it may accurately measure the weight borne by the suspension assembly 80, in a manner similar to that discussed above with reference to the trunnion member 10. Another advantage is that the central pivot member may be used to replace factory-installed components without requiring modification of the major structural components that comprise the suspension assembly 80. The center bushing 88 may be easily removed and replaced with a replacement center bushing 88a, end collars 134, and central pivot member 126. Alternatively, the center bushing 88 may be cut to form the replacement center bushing 88a and end collars 134, but in either case, the required modifications to existing structure are not substantial.

A further advantage of the central pivot member 126 is that it may be installed at the factory to provide new trucks with a weight measurement capability. Factory installation requires only minor modifications of existing components, as discussed above, and may accordingly be accomplished without major disruption of existing production procedures.

Yet a further advantage of the central pivot member 126 when compared with the trunnion member 10 discussed previously with reference to FIGS. 2–8 is that the central pivot member is more compact than the trunnion member. Accordingly, the central pivot member may be cheaper to manufacture and easier to handle during installation.

Still a further advantage of the central pivot member 126 is that it may be removed from the vehicle on which it is installed by simply loosening the caps 98 from the end collars 134 and unbolting the central pivot member from the end collars. The central pivot member 126 may accordingly be easily removed for servicing and/or replacement.

Figure 13:
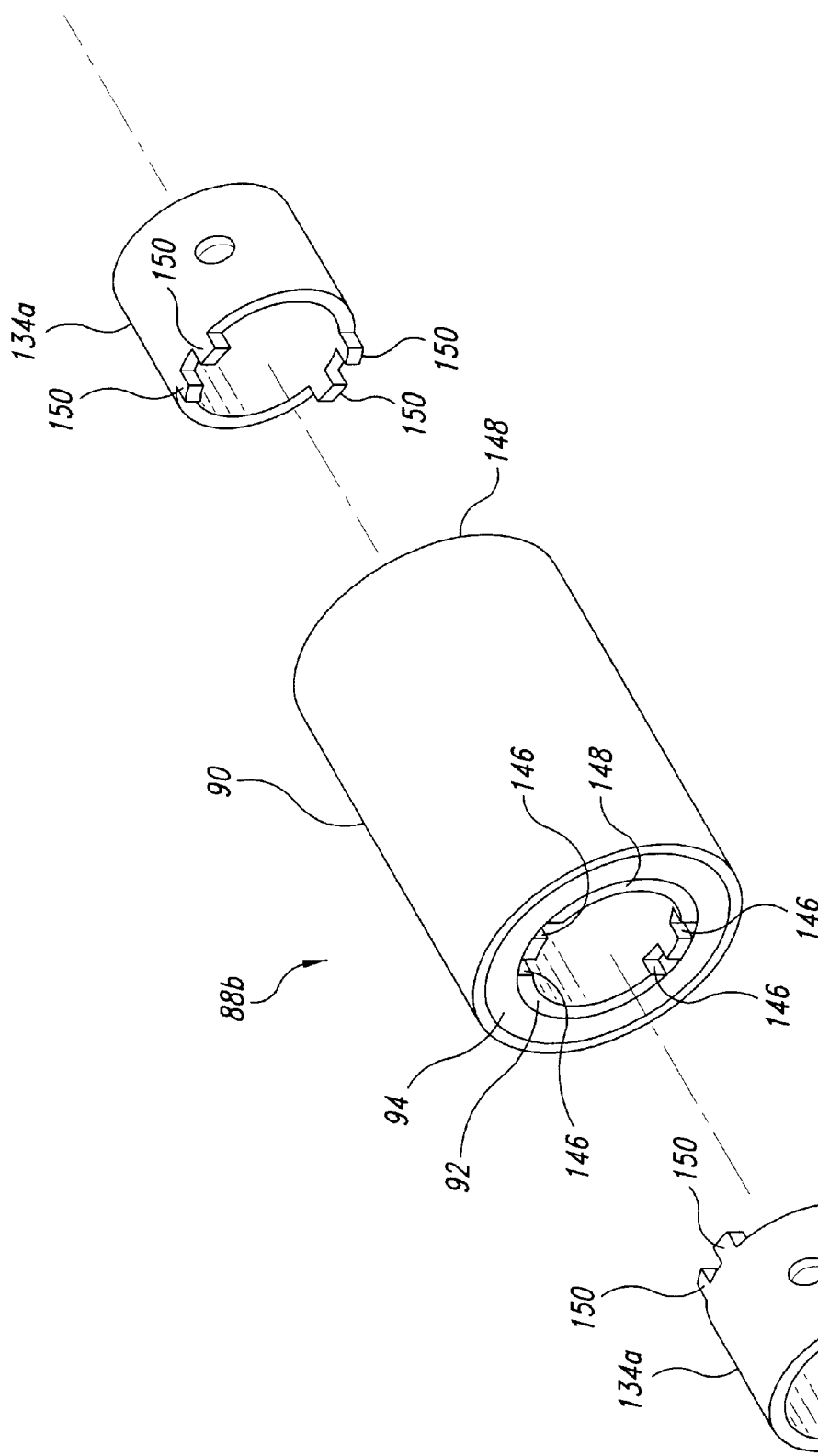
FIG. 13 is an exploded isometric view of an alternate embodiment of a portion of the weight measurement apparatus shown in FIG. 11.

FIG. 13 is an exploded isometric view of an alternate embodiment of a replacement center bushing 88b having notches 146 positioned in each end face 148 of the inner sleeve 92. The notches 146 engage with corresponding teeth 150 positioned in the end collar 134a. When the end collars 134a and replacement center bushing 88b are installed on the central member 82, the teeth 150 engage with the notches 146 to prevent rotational motion of the end collars relative to the center bushing. In one embodiment, the notches 146 and teeth 150 are positioned to slide vertically with respect to each other by a small amount, as shown in FIG. 13, so that the end collars 134a do not tend to bind against the replacement center bushing 88b when they are placed under load. The tooth-and-notch arrangement may be advantageous where it is desirable to use the flexible insert 94 to account for any differential pivotal motion between the end collars 134 and the replacement center bushing 88b. Conversely, it may be advantageous to allow the end collars 134 to rotate with respect to the replacement center bushing 88a, as shown in FIG. 11, so as to reduce the wear rate of the flexible insert 94.

In a further alternate embodiment, the end collars 134 and center bushing 88 may be eliminated entirely. Accordingly, the end regions 132 of the central pivot member 126 may be sized to be clamped directly to the saddle assembly 84 with the caps 98, and the central region 130 of the central pivot member may be sized to slidably fit within the center aperture 86. An advantage of such an embodiment is that by eliminating the end collars 134 and the center bushing 88, the suspension assembly is simplified. Conversely, an advantage of retaining the bushing 88 and the end collars 134 is that the bushing may be configured to wear more rapidly than the central pivot member so that over time, the relatively inexpensive bushing will wear out and require replacement while the relatively more expensive central pivot member remains relatively less worn. Consequently, the bushings are preferably eliminated only where the loads borne by the central pivot member 126 will not cause the central pivot member to wear more rapidly than the central member 82 against which it rotates.

Figure 14:
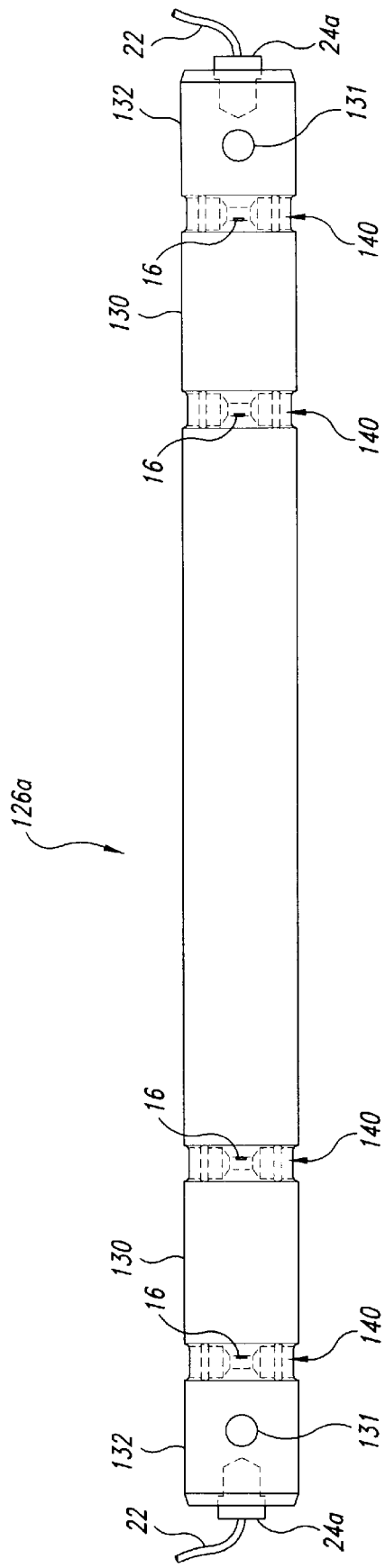
FIG. 14 is a top plan view of an alternate embodiment of the pivot member shown in FIG. 11.

FIG. 14 is a top view of an alternate embodiment of an elongated central pivot member 126a sized to extend between two spaced-apart central members 82 which together comprise the suspension assembly 80. The elongated central pivot member 126a is sized to replace the center tube 106 of the suspension assembly 80 (FIG. 10) and may record the entire weight borne by the suspension assembly 80 while at the same time preventing the central members 82 comprising the suspension assembly from moving toward or apart from each other. Accordingly, an advantage of the elongated central pivot member 126a, in addition to the advantages of the central pivot member 126 discussed above, is that a single replacement part may be used to replace the center tube 106 while at the same time adding a weight measuring capability to the suspension assembly.

Figure 15:
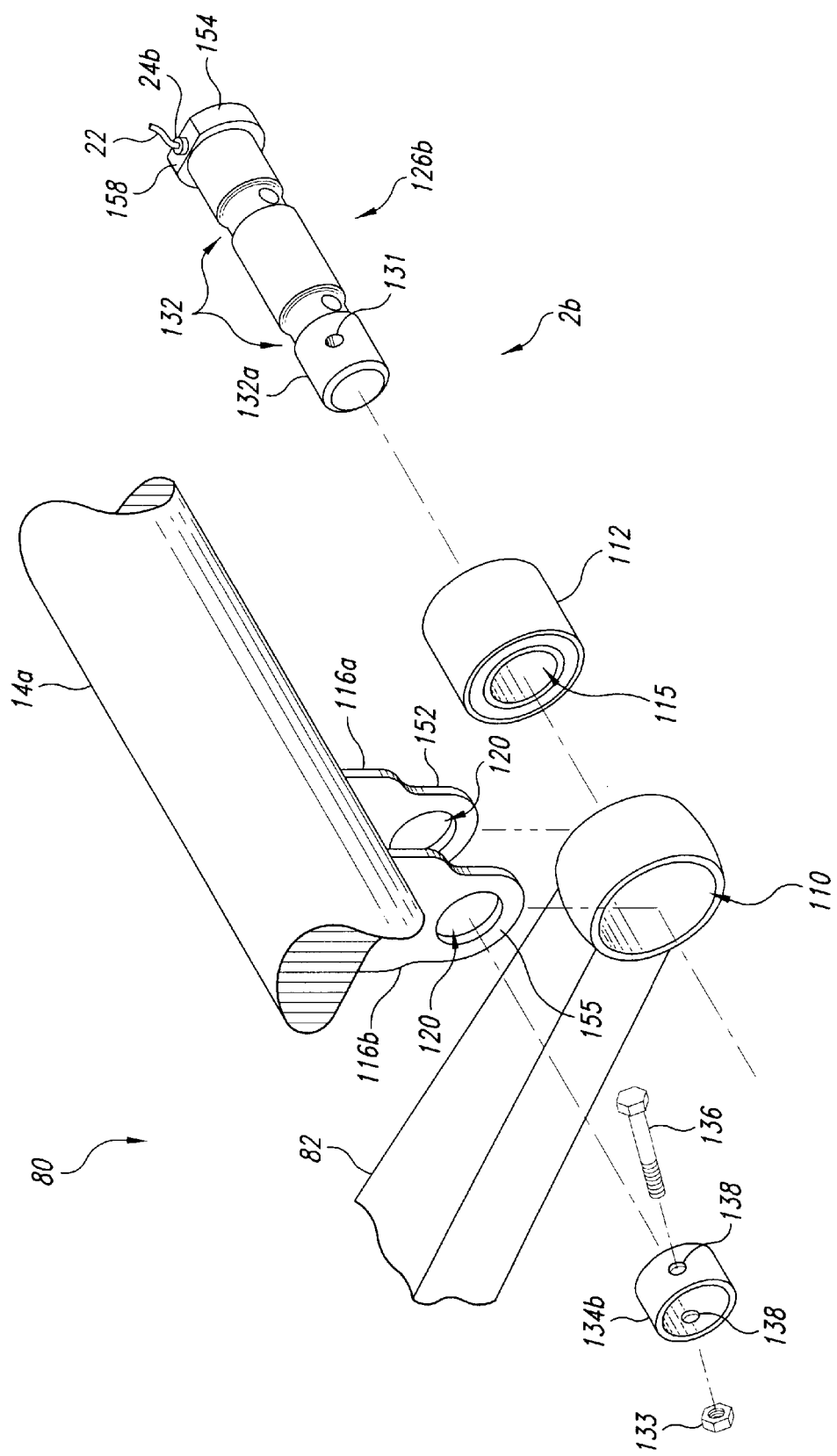
FIG. 15 is an exploded isometric view of a portion of the suspension assembly shown in FIG. 10 having a weight measurement apparatus with a pivot member in accordance with a second alternate embodiment of the invention.

FIG. 15 is an exploded isometric view of a portion of the suspension assembly 80 shown in FIG. 8, having a weight measurement apparatus 2b in accordance with a second alternate embodiment of the invention. The apparatus 2b includes an end pivot member 126b which pivotally couples the central member 82 to the axle 14a, as discussed below.

As shown in FIG. 15, the central member 82 has an end bushing 112 positioned within the end aperture 110 thereof, substantially as shown in FIG. 10. The central collar 114 and end collars 118 shown in FIG. 10 are removed and the axle 14a is positioned proximate to the central member 82 such that the apertures 120 of the axle mounts 116a and 116b are aligned with the end aperture 110 and the bushing aperture 115. The end pivot member 126b is inserted through the apertures 120 of the axle mounts 116a, and through the bushing aperture 115 of the end bushing 112 until a flange 154 of the end pivot member engages an inner end face 152 of one of the axle mounts 116a. At this point, an outer end region 132a of the end pivot member 126b opposite the flange 154 extends outwardly beyond an outer end face 155 of the opposite axle mount 116b. The end collar 134b is positioned adjacent the outer end face 154 of the axle mount 116b and is tack welded to the end face. The bolt 136 is then passed through the collar mounting holes 138 of the end collar 134b and through the mounting hole 131 of the end pivot member to threadably engage the corresponding nut 133 and secure the outer end region 132a of the end pivot member 126b to the axle 14a.

The end pivot member 126b is configured in substantially the same fashion as the central pivot member 126 discussed in detail above with reference to FIGS. 12A–C. One difference between the end pivot member 126b shown in FIG. 15 and the central pivot member 126 shown in FIGS. 12A–C is that the end pivot member 126b includes a flange 154 to prevent unwanted axial movement of the end pivot member once it is installed. The flange includes a flat 158 which houses an aperture sized to retain the connector 24b. The flat is preferably oriented such that the connector 24b and the cable 22, which extends from the connector, are easily routed along the axle mount 116 and axle 14a to the decoder 26 (FIG. 3).

The end pivot member 126b is preferably configured to be coupled at each end region 132 to the axle 14a by engaging the axle mounts 116a and 116b. In alternate embodiments, the end pivot member 126b may be cantilevered in a manner substantially similar to that discussed above with reference to FIGS. 10 and 11 without affecting the accuracy of the weight measured by the end pivot member. In further alternate embodiments, the end bushing 112 may be eliminated, generally as discussed previously with reference to the center bushing 88.

In one embodiment, end pivot members 126b may be positioned in both end bushings 112 of the central member 82 (FIG. 10). In an alternate embodiment, a single end pivot member 126b may be positioned in one of the end bushings 112 and the load value recorded by the end pivot member may be doubled to reflect the true load borne by the central member 82.

One advantage of the end pivot member 126b positioned in the end bushing 112 when compared with the central pivot member 126 positioned in the center bushing 88 is that the end bushing 112 need not be modified in any way to accommodate the end pivot member 126b. As shown in FIGS. 10 and 11, the installation of the central pivot member 126 requires that the end portions 96 be removed from the center bushing 88 or that a replacement center bushing 88a be positioned in place of the center bushing 88. The end bushing 112, by contrast, does not include end portions which must be removed or replaced.

Figure 16:
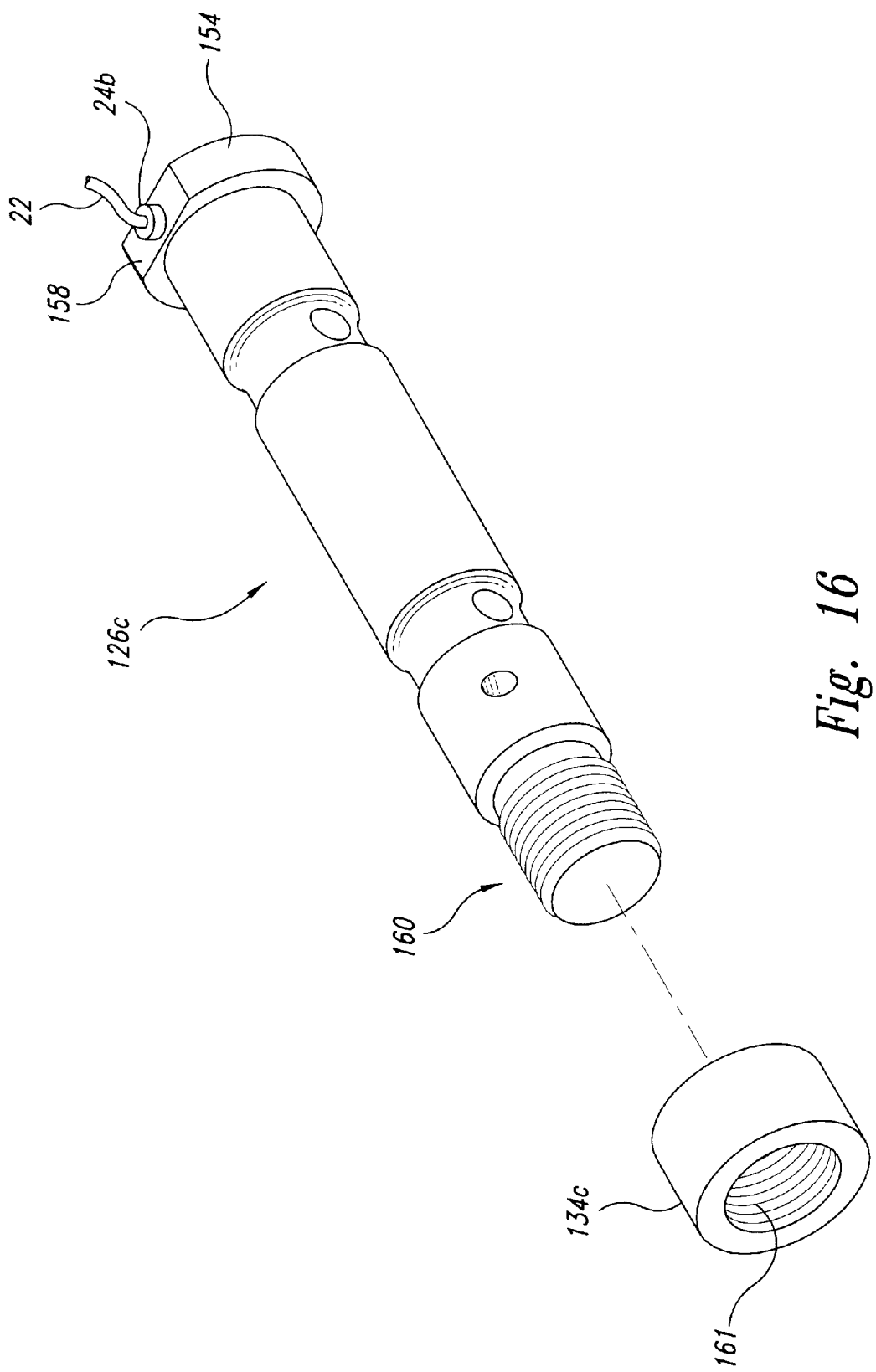
FIG. 16 is a detailed isometric view of an alternate embodiment of the pivot member shown in FIG. 15.

FIG. 16 is an isometric view of an alternate embodiment of a pivot member 126c suitable for installation in the end bushing 112, as discussed above. The pivot member 126c includes a threaded portion 160 positioned opposite the flange 154. The end collar 134c has corresponding internal threads 161 to accommodate the threaded portion 160. An advantage of the end collar 134c shown in FIG. 16 is that it may easily be removed, if necessary, after it has been installed on a suspension assembly 80. Conversely, an advantage of the unthreaded end collar 134b shown in FIG. 15 is that it is fixedly mounted to the axle mount 116b. Accordingly, a relatively small bolt 136 may be used to connect the unthreaded end collar 134b to the pivot member 126b. The small bolt 136 may be easier to install and remove than the larger threaded end collar 134c.

Figure 17:
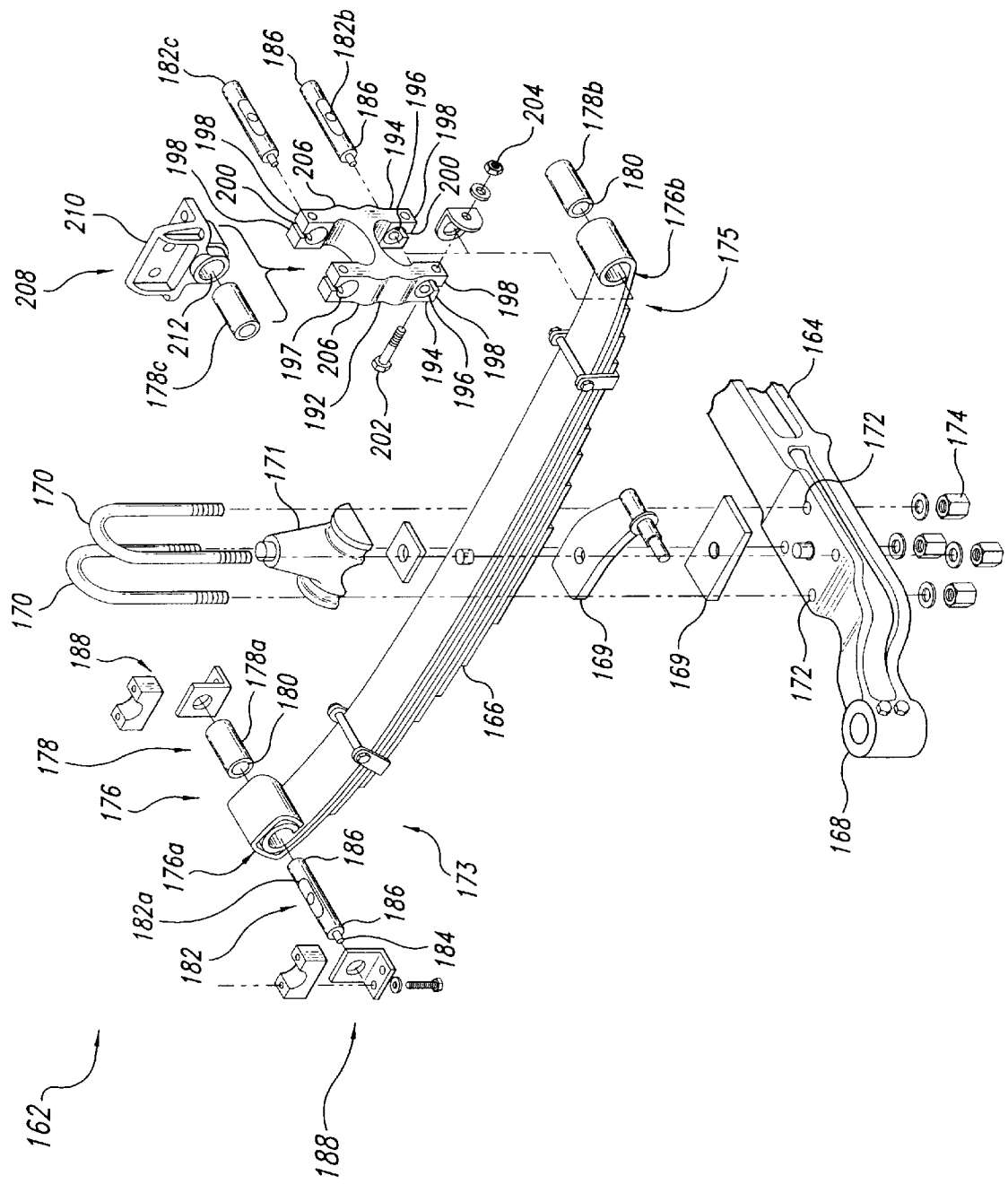
FIG. 17 is a partially exploded isometric view of a steering axle suspension assembly suitable for installation of a weight measurement apparatus in accordance with an embodiment of the invention.

FIG. 17 is an isometric view of a steering axle suspension assembly 162, comprising a steering axle 164 attached at each end to a leaf spring 166. For purposes of clarity, only one leaf spring is shown in FIG. 17. The leaf spring is in turn connected to a truck frame 77 (FIG. 3) to allow the steering axle to move in an upward and downward direction relative to the frame 77 as the truck travels over rough terrain. The steering axle 164 includes a wheel mount 168 to which a wheel (not shown) is attached. The wheel may be pivotally mounted to the wheel mount 168 so as to pivot relative to the steering axle 164 and steer the truck to which it is attached. The suspension assembly 162 may also include a shock absorber (not shown for purposes of clarity) to cushion the ride of the truck.

The steering axle 164 is connected to the leaf spring 166 with U-bolts 170 which pass over the leaf spring 166 and through mounting holes 172 of the steering axle 164. The U-bolts 170 are threadably connected to nuts 174 to clamp the steering axle 164 to the leaf spring 166. A U-bolt retainer 171 substantially prevents motion of the U-bolts 170 along the leaf spring 166 and shims 169 space the leaf spring from the steering axle 164. Other attachment means may be used in other embodiments.

The leaf spring 166 includes a forward portion 173 and a rear portion 175, and further includes mounting apertures 176 including a forward mounting aperture 176a positioned in the forward portion 173 and a rear mounting aperture 176b positioned in the rear portion 175. The mounting apertures 176 are pivotally coupled to the truck frame to allow the leaf spring 166 to flex relative to the truck frame, as discussed below. The mounting apertures 176 are sized and shaped to accommodate spring bushings 178 therein. Accordingly, the forward mounting aperture 176a has a forward spring bushing 178a fixedly mounted therein and the rear mounting aperture 176b has a rear spring bushing 178b fixedly mounted therein. Each spring bushing 178 has a bushing aperture 180 sized and shaped to slidably accommodate a spring pin 182 therein. Each spring pin 182 has end portions 186 which extend outwardly from the bushing aperture 180, and a grease fitting 184 which is configured to supply grease to the spring pin to lubricate the interface between the spring pin and the spring bushing 178.

The spring pins 182 include a forward spring pin 182a positioned in the forward spring bushing 178a such that the end portions 186 thereof extend outwardly from the forward mounting aperture 176a and the forward spring bushing. The end portions 186 are clamped with pin bracket assemblies 188 to the truck frame to securely fasten the forward spring pin 182a to the truck frame. The forward spring pin 182a fits slidably within the bushing aperture 180 of the forward spring bushing 178a to allow the forward spring bushing and leaf spring 166 to rotate relative to the forward spring pin 182a, thereby accommodating the motion of the leaf spring as it flexes relative to the truck frame while under load.

The rear portion 175 of the leaf spring 166 is coupled to the truck frame with an articulation member 192. The articulation member 192 includes lower legs 194 which are spaced apart to accommodate the rear portion 175 of the leaf spring 166 therebetween. Each lower leg 194 includes clamping portions 198 which are separated at the ends thereof by a slot 200. The lower legs 194 further include lower mounting holes 196 which are aligned with the rear mounting aperture 176b. The rear spring bushing 178b is fixedly inserted into the rear mounting aperture 176b and a lower rear spring pin 182b is inserted through the lower mounting holes 196 and the rear spring bushing 178b to pivotally couple the rear portion 175 of the leaf spring 166 to the articulated member 192. The end portions 186 of the lower rear spring pin 182b are securely coupled to the articulated member 192 by drawing the clamping portions 198 together around the end portions with bolts 202 and nuts 204 in a conventional manner.

The articulated member 192 further includes upper legs 206 which are spaced apart to accommodate an articulated member bracket 208 therebetween. The upper legs 206 include upper mounting holes 197 and clamping portions 198 which are separated at the ends thereof by slots 200. The articulated member bracket 208 has a bracket flange 210 which is fixedly mounted to the truck frame with nuts and bolts or other conventional means. The articulated member bracket 208 further has a member mounting aperture 212 which extends therethrough and is sized and shaped to accommodate an upper spring bushing 178c therein. The upper legs 206 are pivotally mounted to the articulation member bracket 208 with an upper rear spring pin 182c in substantially the same manner as the lower legs 194 are pivotally coupled to the rear portion 175 of the leaf spring 166 with the lower rear spring pin 182b. Accordingly, the upper rear spring pin 182c is inserted through the upper mounting holes 197, and through the upper spring bushing 178c which is mounted in the member mounting aperture 212. The upper rear spring pin 182c is clamped into place by drawing the clamping portions 198 of the upper legs 206 together with the bolt 202 and nut 204 (not shown for purposes of clarity) in a manner similar to that discussed above with reference to the lower rear spring pin 182b. The articulated member 192 accordingly rotates about the upper rear spring pin 182a and allows the leaf spring 166 to remain coupled to the truck frame as the leaf spring lengthens and contracts under load.

Figure 18:
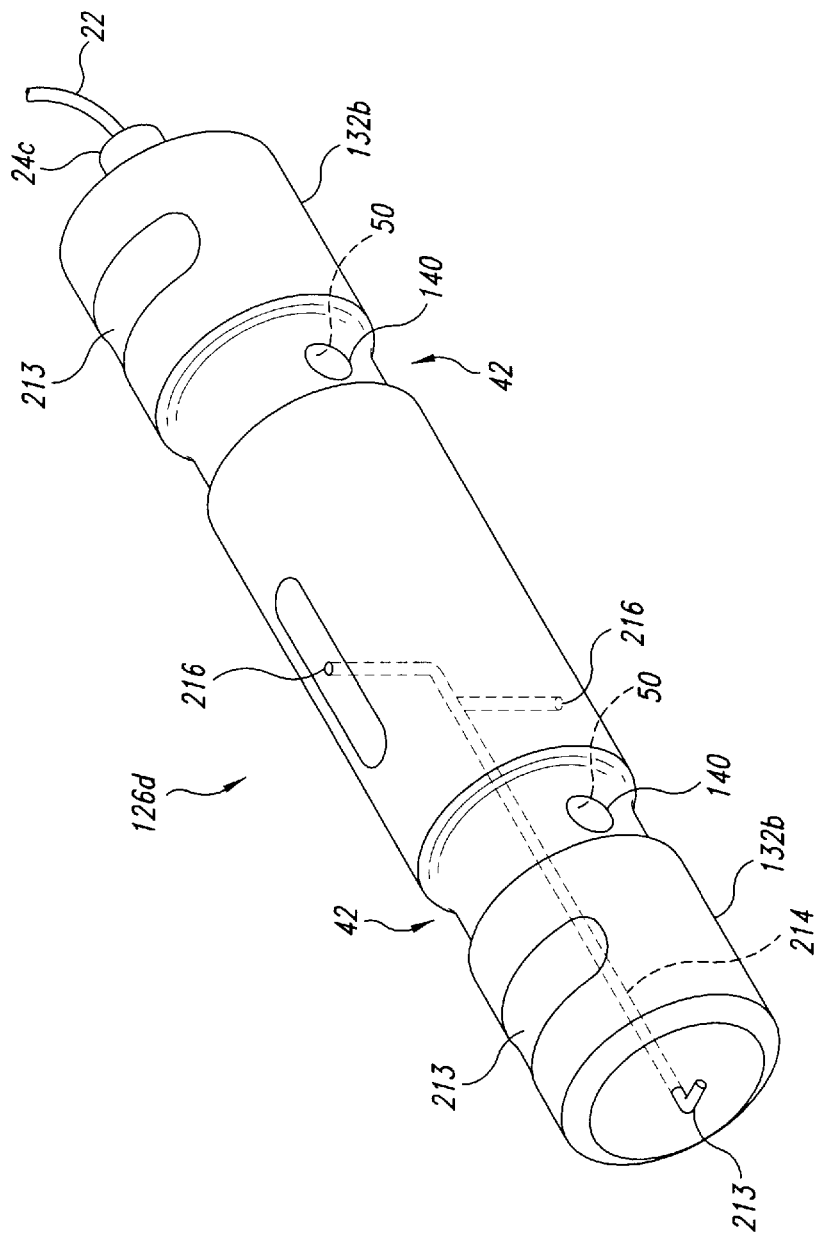
FIG. 18 is an isometric view of a pivot member sized and shaped to be installed on the suspension assembly shown in FIG. 17 in accordance with a third embodiment of the invention.

FIG. 18 is an isometric view of a spring pivot member 126d which is sized and shaped to replace the spring pins 182 shown in FIG. 17. The spring pivot member 126d is substantially similar in overall size and shape to the spring pins 182 so as to easily replace the spring pins. Accordingly, the spring pivot member 126d is sized to fit within the bushing aperture 180 of the spring bushings 178 and has end portions 132b sized and shaped to be clamped by the clamping portions 198 of the articulation member 192 or by the pin bracket assembly 188 shown in FIG. 17. In a preferred embodiment, both end portions 132b are clamped, though in alternate embodiments, a single end portion may be clamped so as to cantilever the spring pivot member 126d in a manner substantially similar to that discussed above with reference to FIGS. 10 and 11. In further alternate embodiments, the spring bushing 178 may be eliminated and the spring pivot member 126d sized to fit directly in either the forward mounting aperture 176a or the rear mounting aperture 176b.

In one embodiment, the spring pivot member 126d can be constructed and can operate in a manner generally similar to that of the central pivot member 126 discussed above with reference to FIGS. 10–12. Accordingly, the spring pivot member 126d can have circumferential grooves 42 which concentrate the stress borne by the pivot member in the aperture walls 50 thereof. The circumferential grooves concentrate the stress in the apertures 140 even if the spring pivot member 126d tends to move in an axial direction relative to the leaf spring 166 or the articulation member 192. Where the spring pivot member 126d does not tend to move axially, the circumferential grooves 42 may be eliminated, so long as the spring pivot member 126d is not directly loaded at the same axial location occupied by the strain gages. In a similar manner, the circumferential grooves of the trunnion member 10 (FIG. 3), the central pivot member 126 (FIG. 11), and the end pivot member 126b (FIG. 15) may also be eliminated where axial motion of the respective members is reduced or non-existent.

The spring pivot member 126d is configured in generally the same fashion as the central pivot member 126 and end pivot member 126b discussed previously with reference to FIGS. 12A–C and 15–16. One difference between the spring pivot member 126d and the pivot members previously discussed is that the spring pivot member 126d includes slots 213 milled in the surface of each end portion 132b substantially transverse to the major axis of the spring pivot member. The slots 213 are sized and positioned to provide clearance for a portion of the bolts 202 which draw the clamping portions 198 together around the spring pivot member when it is installed so that the bolts do not mechanically interfere with the spring pivot member. The spring pivot member 126d further includes a grease fitting 184a which supplies grease or other lubricants through a grease channel 214 to grease exit apertures 216 to lubricate the spring pivot member 126d as it pivots within the spring bushings 178. The grease channel 214 passes adjacent the apertures 140, which are filled with potting material, generally as discussed previously with reference to FIG. 11. Strain gages (not shown) are mounted to the walls 50 of the apertures 140 and are electrically coupled to a connector 24c substantially as discussed previously with reference to FIGS. 4, 5 and 12A–C. The connector 24c may be coupled to the decoder 26 with the cable 22, substantially as shown in FIG. 2. Accordingly, the spring pivot member 126c may be used to determine the weight of the load borne by the steering axle 164.

In one embodiment, a spring pivot member 126d is used to replace each of the forward spring pins 182a and the weight values determined by the spring pivot members 126d are doubled to account for the fact that half the load is borne by the rear portion of the leaf springs. The weight values may be doubled again if the forward spring pin 182c of only one of the leaf springs 166 comprising the steering axle assembly 162 is replaced with a spring pivot member 126d. In another embodiment, either the lower rear spring pin 182b or the upper rear spring pin 182c is also replaced with a spring pivot member 126d and the values recorded by the spring pivot members are summed to determine the total weight of the load borne by the steering axle.

An advantage of the spring pivot member 126d is that it may be easily installed in place of the spring pins 182 to provide a weight measurement capability for the steering axle suspension assembly 162. A further advantage, as discussed above with reference to the end pivot member 126, is that the spring pivot member 126d may be installed on the suspension assembly at the time of manufacture without requiring substantial changes in production procedures. Yet another advantage is that the spring pivot member 126d may be installed on the steering axle assembly in combination with a central pivot member, end pivot member, or trunnion member to measure the entire weight of a multi-axle vehicle. The vehicle may comprise a tractor-trailer combination, a single unit, or other types of vehicles. Other such applications will be readily apparent to those skilled in the art.

While the weight measurement apparati shown in the foregoing figures are directed toward replacement of specific suspension system components, such as trunnion tubes and axle bushing components, the scope of the invention is not so limited. Accordingly, replacement of any existing vehicle component subjected to bending stresses, with a similarly sized component having strain gages or other load sensors mounted thereto, is within the scope of the present invention. For example, FIGS. 19 and 20, discussed in greater detail below, illustrate further applications of weight measurement devices to vehicles, in accordance with further embodiments of the invention.

Figure 19:
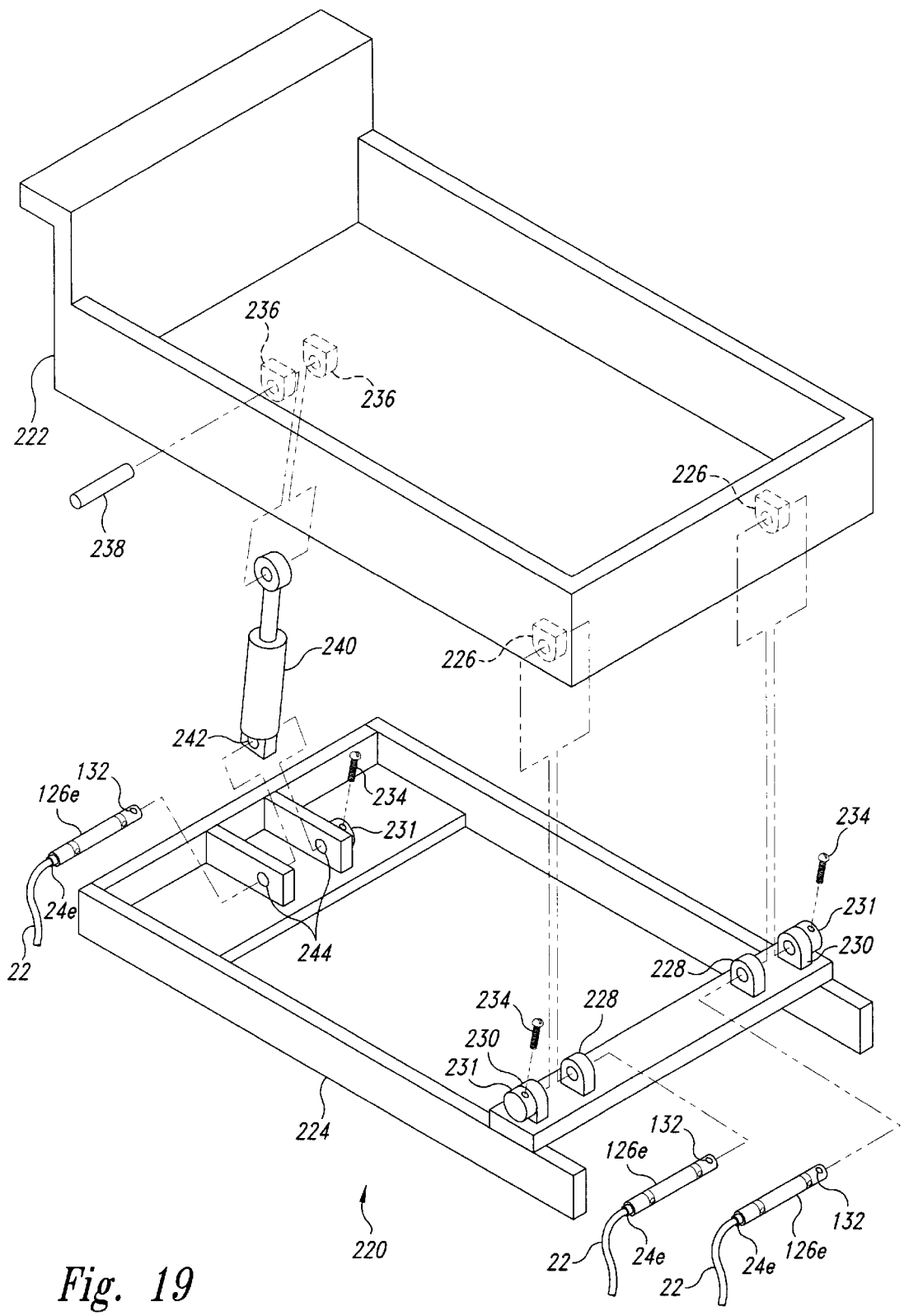
FIG. 19 is an exploded side isometric view of a frame and dump body of a dump truck having a weight measurement device in accordance with another embodiment of the invention.

FIG. 19 is an exploded side isometric view of a portion of a dump truck 220 including a dump body 222 pivotally mounted to a frame 224. For purposes of illustration, the support wheels, cab, and other portions of the dump truck 220 are not shown in FIG. 19. The rear of the dump body 222 includes two central hinge members 226 that each fit between corresponding inner hinge members 228 and outer hinge members 230 of the frame 224. The inner and outer hinge members 228 and 230 are pivotally coupled to the central hinge members 226 with pivot members 126e. Each pivot member 126e is generally similar in construction and operation to the pivot members discussed above with reference to FIGS. 10–18. In one embodiment, the pivot members 126e each have a locking aperture 132 for receiving a corresponding bolt 234 that passes through a collar 231 welded to the outer hinge member 230 to secure the pivot member 126e in place. Each pivot member 126e further includes a connector 24e and a lead 22 for coupling to a decoder 26 and display 28, such as are shown in FIG. 2.

The dump body 222 can further include hoist hinge members 236 toward the forward end of the dump body. The hoist hinge members 236 are pivotally connected with a conventional hoist pin 238 to the upper portion of an actuator 240. The lower portion of the actuator 240 is pivotally coupled with a pivot member 126e to the frame 224 by positioning an aperture 242 at the lower end of the actuator 240 between two corresponding apertures 244 of the frame 224, and inserting the pivot member 126e through the apertures 242 and 244. Alternatively, the conventional hoist pin 238 can be replaced with a pivot member 126e. In either case, the actuator 240 can be activated to pivot the dump body 222 about the central hinge members 226 at the rear of the dump body to release a load (not shown) contained in the dump body 222. By measuring the load borne by each of the pivot members 126e, an operator of the dump truck 220 can determine the weight of the dump body 222 and the load contained in the dump body 222.

Figure 20:
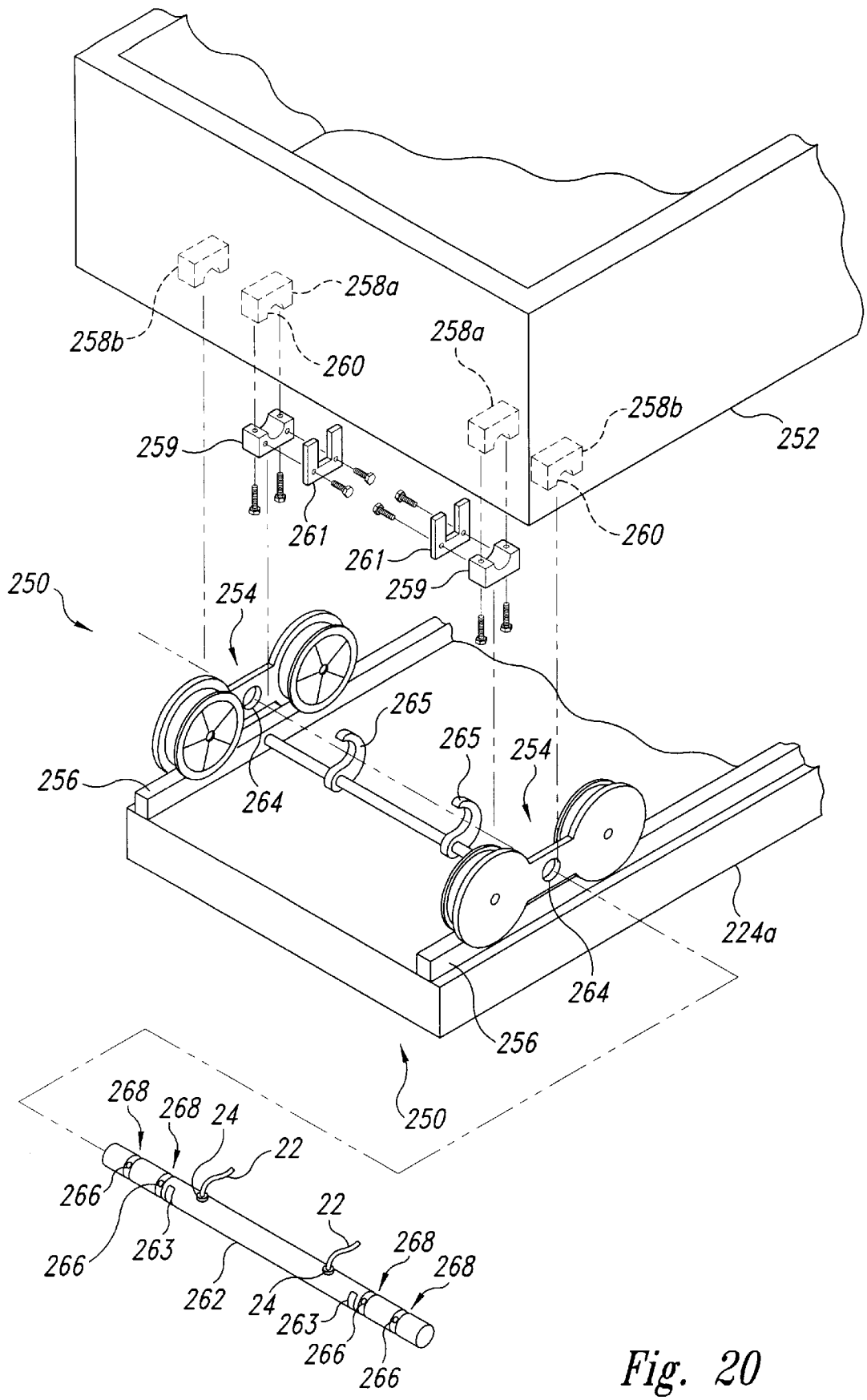
FIG. 20 is an exploded side isometric view of a trailer frame and transfer body in accordance with still another embodiment of the invention.

FIG. 20 is an exploded side isometric view of a portion of a transfer trailer assembly 250 that includes a frame 224a and a payload body 252. For purposes of clarity, the support wheels, cab, and other components of the transfer trailer assembly are not shown in FIG. 20. The payload body 252 can be moved on and off the frame 224a using a winch (not shown) or other means. Accordingly, the payload body 252 can include two wheel assemblies 254 having wheels that rotate along corresponding rails 256 of the frame 224a when the payload body 252 is moved on and off the frame 224a.

The payload body 252 can include two pairs of attachment members 258 (shown as inner attachment members 258a and outer attachment members 258b) for connecting the payload body 252 to the wheel assemblies 254. Each attachment member 258 can have an attachment aperture 260 sized to receive a load bearing member 262. Accordingly, the wheel assemblies 254 are positioned between adjacent attachment members 258a, b of each pair of attachment members, such that wheel assembly apertures 264 are aligned with the attachment apertures 260. The load bearing member 262 is positioned to extend through the aligned attachment apertures 260 and wheel assembly apertures 264 and attachment brackets 259 are bolted to the inner attachment members 258a to couple the wheel assemblies 254 to the payload body 252 via the load bearing member 262. Retaining brackets 261 can be attached to the attachment brackets 259 to engage flats 263 of the load bearing member 262 to prevent the load bearing member 262 from rotating. The load bearing member 262 can be a single unit that extends between the two wheel assemblies 254 (as shown in FIG. 20), or the payload body 252 can include two separate load bearing members, each of which connects one of the wheel assemblies 254 to a corresponding pair of attachment members 258. Pivotable hooks 265 engage the load bearing member 262 when the trailer assembly 250 is in transit to prevent the payload body 252 from inadvertently rolling off the frame 224a.

The load bearing member 262 can be constructed and operated in a manner generally similar to that discussed above with reference to the trunnion member 10 and the pivot members 126. Accordingly, the load bearing member 262 can include apertures 266 which extend through the load bearing member 262 and can have strain gages (not shown) mounted to walls of the apertures thereof, as was generally discussed above with reference to FIGS. 4–6, 9, and 12A–12C. The bores 266 may be contained within circumferential grooves 268 to ensure that the load borne by the payload body 252 is transmitted in shear through the strain gages. As was discussed above with reference to FIGS. 2–19 regarding the trunnion member 10 and the pivot members 126, an advantage of the load bearing member 262 shown in FIG. 20 is that it can be used to accurately determine the weight of a payload borne by the payload body 252.

The present invention is not limited to replacement components alone, and also covers components having a size similar to the size of conventional suspension system components, which are installed at the time of manufacture of the suspension system. Furthermore, the weight measurement apparati disclosed herein may comprise means other than strain gages for determining the weight of the load borne by the vehicle in which the apparati are installed, so long as the means detect a bending stress of the component in which it is installed.

From the foregoing it will be appreciated that, although embodiments of the invention have been described herein for purposes of illustration, various modifications may be made without deviating from the spirit and scope of the invention. Accordingly, the invention is not limited except by the following claims.

What is claimed is:

1. A weight measurement apparatus for a dump truck, the dump truck having a frame, a dump body movable relative to the frame and a hoist coupled between the frame and the dump body for moving the dump body relative to the frame, the hoist pin comprising:

an elongated load bearing member of unitary construction having a first end and a second end opposite the first end, the load bearing member being coupleable to the frame of the dump truck at a first connection location proximate to the first end of the load bearing member and at a second connection location proximate to the second end of the load bearing member, the load bearing member being coupleable to one of the hoist or the dump body at a third connection location between the first and second connection locations, the load bearing member further having a first aperture extending completely through the load bearing member between the first and third connection locations and a second aperture extending completely through the load bearing member between the second and third connection locations, the first and second apertures each having a length, a diameter, and opposing ends, the diameter of each of the first and second apertures at a central location along its length being smaller than the diameter of the respective aperture at its opposing ends;

a first load sensor attached to a wall of the first aperture near the central location to measure a first portion of a load borne by the load bearing member; and a second load sensor attached to a wall of the second aperture near the central location to measure a second portion of the load borne by the load bearing member.

2. The apparatus of claim 1 wherein at least one of the first and second apertures extends in a direction generally perpendicular to an axis extending between the first and second ends of the load bearing member.

3. The apparatus of claim 1 wherein at least one of the first and second apertures extends in a direction generally normal to a direction of a force applied by the load to the load bearing member.

4. The apparatus of claim 1 wherein at least one of the first and second apertures intersects a centerline extending between the first and second ends of the load bearing member.

5. The apparatus of claim 1 wherein the load sensor is positioned at an angle of approximately 50 degrees relative to a direction in which the load is applied to the load bearing member.

6. The apparatus of claim 1 wherein an angle between a first axis normal to the wall at the first load sensor and a second axis aligned with a force applied by the load to the load bearing member is inversely correlated with a diameter of the aperture, the angle being selected to have a first value where the aperture has a first diameter, the angle being selected to have a second value less than the first value where the aperture has a second diameter greater than the first diameter.

7. The apparatus of claim 1 wherein the load bearing member has a generally circular cross-sectional area when intersected by a plane generally perpendicular to an axis extending between the first and second ends of the load bearing member.

8. The apparatus of claim 1 wherein an external surface of the load bearing member has a first recessed region axially aligned with the first load sensor and a second recessed region axially aligned with the second load sensor.

9. The apparatus of claim 8 wherein the first recessed region has a first edge and a second edge spaced apart from the first edge and the first load sensor is positioned within the first and second edges of the first recessed region when viewed generally normal to the first recessed region.

10. A weight measurement apparatus for measuring the weight of a load borne by a vehicle, comprising:

an elongated load bearing member of unitary construction having a first end and a second end opposite the first end, the load bearing member having a first connection location proximate to the first end, a second connection location proximate to the second end, and a third connection location between the first and second connection locations, the first and second connection locations being coupleable to one of the load and a ground support member supporting the vehicle, the third connection location being coupleable to the other of the load and the ground support member of the vehicle, the load bearing member further having a first aperture extending completely through the load bearing member between the first and third connection locations and a second aperture extending completely through the load bearing member between the second and third connection locations, the first and second apertures each having a length, a diameter, and opposing ends, the diameter of each of the first and second apertures at a central location along its length being smaller than the diameter of the respective aperture at its opposing ends; and at least one load sensor attached to a wall of the first aperture near the central location to measure a load borne by the load bearing member.

11. The apparatus of claim 10 wherein the vehicle includes a truck and the ground support member includes a wheel rotatably mounted to the truck, the load bearing member being coupled between the wheel and the load.

12. The apparatus of claim 10 wherein at least one of the first and second apertures extends in a direction generally perpendicular to an axis extending between the first and second ends of the load bearing member.

13. The apparatus of claim 10 wherein at least one of the first and second apertures extends in a direction generally normal to a direction of a force applied by the load to the load bearing member.

14. The apparatus of claim 10 wherein at least one of the first and second apertures intersects a centerline extending between the first and second ends of the load bearing member.

15. The apparatus of claim 10 wherein the load sensor includes a strain gage.

16. The apparatus of claim 10 wherein the load sensor is a first load sensor, the apparatus further comprising a second load sensor attached to the wall of the first aperture and being spaced apart from the first load sensor.

17. The apparatus of claim 10 wherein the load sensor intersects an axis of maximum stress in the load bearing member.

18. The apparatus of claim 10 wherein the load sensor is positioned at an angle of approximately 50 degrees relative to a direction in which the load is applied to the load member.

19. The apparatus of claim 10 wherein an angle between a first axis normal to the wall at the load sensor and a second axis aligned with a force applied by the load to the load member is inversely correlated with a diameter of the aperture, the angle being selected to have a first value where the aperture has a first diameter, the angle being selected to have a second value less than the first value where the aperture has a second diameter greater than the first diameter.

20. The apparatus of claim 10 wherein the load bearing member has a generally circular cross-sectional area when intersected by a plane generally perpendicular to an axis extending between the first and second ends of the load bearing member.

21. The apparatus of claim 10 wherein the load bearing member has a generally rectangular cross-sectional area when intersected by a plane generally perpendicular to an axis extending between the first and second ends of the load bearing member.

22. The apparatus of claim 10 wherein the load bearing member is removably coupled to the ground support member and the load.

23. The apparatus of claim 10 wherein an external surface of the load bearing member has a recessed region proximate to the load sensor.

24. The apparatus of claim 23 wherein the recessed region has a first edge and a second edge spaced apart from the first edge and the load sensor is positioned within the first and second edges of the recessed region when viewed generally normal to the recessed region.

25. The apparatus of claim 10, further comprising an electrical connector attached to the load bearing member at a connection location, the electrical connector being electrically coupled to the load sensor, the load bearing member having at least one channel in an external surface thereof proximate to the connection location for draining substances from the connection location.

26. The apparatus of claim 10 wherein the vehicle includes a truck having a frame and the load includes a transfer trailer removably mounted to the frame of the truck, the load member being coupled at the first and second connection locations to the transfer trailer, the load member further being coupled at the third connection location to a wheel for rolling the transfer trailer along the frame.

27. The apparatus of claim 10 wherein the vehicle includes a dump truck having a frame and a dump body movable relative to the frame, further wherein the load bearing member is coupled at the first and second connection locations to the frame of the dump truck, the load bearing member being coupled at the third connection location to the dump body of the dump truck.

28. The apparatus of claim 10 wherein the vehicle includes a dump truck having a frame, a dump body movable relative to the frame and a hoist between the frame and the dump body for moving the dump body relative to the frame, the load bearing member being coupled at the first and second connection locations to the frame of the dump truck, the load bearing member being coupled at the third connection location to the hoist of the dump truck.

29. The apparatus of claim 10 wherein the vehicle includes a truck trailer having an axle with first and second end portions, the load bearing member being coupled at the first connection location to the first end portion of the axle, the load bearing member being coupled at the second connection location to the second end portion of the axle, the load bearing member being coupled at the third connection location to a frame of the truck trailer.

30. The apparatus of claim 10 wherein the vehicle has an axle assembly, the axle assembly having at least two axles and a central member extending therebetween, the central member being coupled to the load, further wherein the load bearing member is coupled to the load at the first and second connection locations, the load member being pivotably coupled to the central member of the axle assembly at the third connection location.

31. The apparatus of claim 10 wherein the vehicle includes an axle assembly, the axle assembly bearing the load and including an axle connected to a spring, the load bearing member being coupled at the first and second connection locations to the load, the load bearing member being pivotably coupled at the third connection location to the spring.

32. The weight measurement apparatus of claim 10 wherein the first aperture passes through a center of the load bearing member.

33. The weight measurement apparatus of claim 10 wherein the diameter of the first aperture is at a minimum at a midpoint along the length of the first aperture.

34. The weight measurement apparatus of claim 10 wherein the diameter of the first aperture is a function of a distance from one of the opposing ends of the aperture.

35. The weight measurement apparatus of claim 10 wherein the diameter of the first aperture is constant along a portion of the length of the first aperture proximal to the central location.

36. A weight measurement apparatus for a transfer trailer, the transfer trailer including a load body coupled to at least one wheel for rolling the load body along a portion of a truck frame, the apparatus comprising:

an elongated load bearing member of unitary construction having a first end and a second end opposite the first end, the load bearing member being coupleable to the load body at a first connection location proximate to the first end of the load bearing member and a second connection location proximate to the second end of the load bearing member, the load bearing member being coupleable to the at least one wheel at a third connection location between the first and second connection locations, the load bearing member further having a first aperture extending completely through the load bearing member between the first and third connection locations and a second aperture extending completely through the load bearing member between the second and third connection locations, the first and second apertures each having a length, a diameter, and opposing ends, the diameter of each of the first and second apertures at a central location along its length being smaller than the diameter of the respective aperture at its opposing ends;

a first load sensor attached to a wall of the first aperture near the central location to measure a first portion of a load borne by the load body; and a second load sensor attached to a wall of the second aperture near the central location to measure a second portion of the load borne by the load body.

37. The apparatus of claim 36 wherein at least one of the first and second apertures extends in a direction generally perpendicular to an axis extending between the first and second ends of the load bearing member.

38. The apparatus of claim 36 wherein at least one of the first and second apertures extends in a direction generally normal to a direction of a force applied by the load to the load bearing member.

39. The apparatus of claim 36 wherein at least one of the first and second apertures intersects a centerline extending between the first and second ends of the load bearing member.

40. The apparatus of claim 36 wherein the load sensor is positioned at an angle of approximately 50 degrees relative to a direction in which the load is applied to the load member.

41. The apparatus of claim 36 wherein the load bearing member has a generally circular cross-sectional area when intersected by a plane generally perpendicular to an axis extending between the first and second ends of the load bearing member.

42. The apparatus of claim 36 wherein an external surface of the load bearing member has a recessed region proximate to the first load sensor.

43. The apparatus of claim 42 wherein the recessed region has a first edge and a second edge spaced apart from the first edge and the first load sensor is positioned within the first and second edges of the recessed region when viewed generally normal to the recessed region.

44. A weight measurement apparatus for measuring the weight of a load borne by a vehicle, comprising:

an elongated load bearing member of unitary construction having a first end and a second end opposite the first end, the load bearing member having a first connection location proximate to the first end, a second connection location proximate to the second end, and a third connection location between the first and second connection locations, the first and second connection locations being coupleable to one of the load and a ground support member supporting the vehicle, the third connection location being coupleable to the other of the load and the wheel of the vehicle, the load bearing member further having a first aperture extending completely through the load bearing member between the first and third connection locations and a second aperture extending completely through the load bearing member between the second and third connection locations, the first and second apertures each having a length, a diameter, and opposing ends, the diameter of each of the first and second apertures at a central location along its length being smaller than the diameter of the respective aperture at its opposing ends;

at least one load sensor attached to a wall of the first aperture near the central location to measure a load borne by the load bearing member;

a decoder coupled to the load sensor, the decoder being capable of receiving a load measurement signal generated by the load sensor and converting the load measurement signal to a digital signal representing the weight of the load; and a display mechanism coupled to the decoder for displaying the digital signal to a user.

45. The apparatus of claim 44 wherein the load sensor includes a strain gage.

46. The apparatus of claim 44 wherein the load sensor intersects an axis of maximum stress in the load bearing member.

47. The apparatus of claim 44 wherein the aperture extends from an external surface of the load bearing member through the center of the load bearing member, the aperture having a first diameter proximate to the center of the load bearing member that is smaller than a second diameter of the aperture proximate to the external surface of the load bearing member.

48. A method for forming a weight measurement apparatus for measuring the weight of a load borne by a vehicle, comprising:

forming first and second apertures in an elongated load bearing member of unitary construction such that the first and second apertures extend through the load bearing member in a direction generally normal an axis along which the load bearing member is elongated, the first and second apertures each having a length, a diameter, and opposing ends, the diameter of each of the first and second apertures at a central location along its length being smaller than the diameter of the respective aperture at its opposing ends;

attaching at least one load sensor to a wall of the first aperture at a location proximate to the central location; and coupling the load bearing member between the load and a support member supporting the vehicle by coupling one of the load and the support member to the load bearing member at first and second spaced apart locations of the load bearing member and coupling the other of the load and the support member to a third location of the load bearing member between the first and second locations of the load bearing member.

49. The method of claim 48 wherein forming at least one of the first and second apertures includes extending the at least one aperture in a direction generally perpendicular to an axis extending between the first and second ends of the load bearing member.

50. The method of claim 48 wherein forming at least one of the first and second apertures includes extending the at least one aperture in a direction generally normal to a direction of a force applied by the load to the load bearing member.

51. The method of claim 48 wherein forming at least one of the first and second apertures includes intersecting the at least one aperture with a centerline extending between the first and second ends of the load bearing member.

52. The method of claim 48 wherein attaching the load sensor includes positioning the load sensor at an angle of approximately 50 degrees relative to a direction with which the load is applied to the load member.

53. The method of claim 48 wherein attaching the load sensor includes attaching the load sensor such that an angle between a first axis normal to the wall at the load sensor and a second axis aligned with a force applied by the load to the load member is inversely correlated with a diameter of the aperture, further comprising selecting the angle to have a first value where the aperture has a first diameter and selecting the angle to have a second value less than the first value where the aperture has a second diameter greater than the first diameter.

54. The method of claim 48 wherein the forming at least one of the first and second apertures includes tapering the at least one aperture to have a first diameter proximate to the center of the load bearing member that is smaller than a second diameter of the aperture proximate to the external surface of the load bearing member.

55. The method of claim 48 wherein coupling the load bearing member includes removably coupling the load bearing member to the wheels and the load.

56. The method of claim 48, further comprising recessing an external surface of the load bearing member proximate to the load sensor.

57. The apparatus of claim 56 wherein recessing the external surface of the load bearing member includes positioning first and second spaced apart edges of a recess such that the load sensor is positioned within the first and second edges of the recess when viewed generally normal to the recess.

58. The method of claim 48 wherein coupling the load bearing member includes removably coupling the load bearing member at the first and second connection locations to a transfer trailer and coupling the load bearing member at the third connection location to a wheel for rolling the transfer trailer along a frame of a truck.

59. The method of claim 48 wherein coupling the load bearing member includes coupling the load bearing member at the first and second connection locations to a frame of a dump truck and coupling the load bearing member at the third connection location to a dump body of the dump truck.

60. The method of claim 48 wherein coupling the load bearing member includes coupling the load bearing member at the first and second connection locations to a frame of a dump truck and coupling the load bearing member at the third connection location to a hoist of the dump truck for moving a dump body of the dump truck relative to the frame of the dump truck.

61. The method of claim 48 wherein coupling the load bearing member includes coupling the load bearing member between an axle and a frame of a truck trailer by coupling the load bearing member at the first connection location to the first end portion of the axle, coupling the load bearing member at the second connection location to a second end portion of the axle, and coupling the load bearing member at the third connection location to the frame of the truck trailer.

62. The method of claim 48 wherein coupling the load bearing member includes coupling the load bearing member between an axle assembly of the vehicle and the load, the axle assembly having at least two axles and a central member extending therebetween, coupling the load bearing member further including coupling the load bearing member to the load at the first and second connection locations and pivotably coupling the load member to the central member of the axle assembly at the third connection location.

63. The method of claim 48 wherein the vehicle includes an axle assembly bearing the load, the axle assembly including an axle connected to a spring, further wherein coupling the load bearing member includes coupling the load bearing member at the first and second connection locations to the load and pivotably coupling the load bearing member at the third connection location to the spring.

* * * * *